United States Patent
Kim et al.

(10) Patent No.: US 11,178,449 B2
(45) Date of Patent: Nov. 16, 2021

(54) SYSTEMS AND METHODS FOR INTELLIGENTLY MANAGING STORAGE SPACE OCCUPIED BY MEDIA ASSETS

(71) Applicant: Rovi Guides, Inc., San Jose, CA (US)

(72) Inventors: Clayton Kim, Boston, MA (US); Lucas Waye, Cambridge, MA (US); Richard Eric Miller, Milton, MA (US); Matthew John Emerson, Burlington, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/979,071

(22) PCT Filed: Mar. 9, 2018

(86) PCT No.: PCT/US2018/021845
§ 371 (c)(1),
(2) Date: Sep. 8, 2020

(87) PCT Pub. No.: WO2019/172939
PCT Pub. Date: Sep. 12, 2019

(65) Prior Publication Data
US 2021/0058666 A1    Feb. 25, 2021

(51) Int. Cl.
*H04N 21/4335* (2011.01)
*H04N 21/4147* (2011.01)
*H04N 21/418* (2011.01)
*H04N 21/433* (2011.01)

(52) U.S. Cl.
CPC ..... *H04N 21/4335* (2013.01); *H04N 21/4147* (2013.01); *H04N 21/4184* (2013.01); *H04N 21/4334* (2013.01)

(58) Field of Classification Search
CPC ........... H04N 21/4335; H04N 21/4147; H04N 21/4184; H04N 21/4334
See application file for complete search history.

(56) References Cited

U.S. PATENT DOCUMENTS

| | | | |
|---|---|---|---|
| 6,239,794 B1 | 5/2001 | Yuen |
| 6,564,378 B1 | 5/2003 | Satterfield |
| 7,165,098 B1 | 1/2007 | Boyer |
| 7,761,892 B2 | 7/2010 | Ellis |
| 8,046,801 B2 | 10/2011 | Ellis |

(Continued)

OTHER PUBLICATIONS

PCT International Search Report for International Application No. PCT/US2018/021845, dated Dec. 10, 2018 (15 pages).

*Primary Examiner* — Mishawn N. Hunter
(74) *Attorney, Agent, or Firm* — Haley Guiliano LLP

(57) ABSTRACT

Systems and methods are provided reducing storage space occupied by a media asset by adjusting quality levels of the media asset downward over time. This may be accomplished by a media guidance application that store, at a given time, the media asset in a first format having a first quality level. The media guidance application retrieves, from a database, a data entry corresponding to the media asset and determines, based on the data entry, a threshold period of time for storing the media asset in the first format. The media guidance application detects whether the threshold period of time since the given time has passed and responds by altering a first portion of the media asset from the first format having the first quality level to a second format having a second quality level that is inferior to the first quality level.

20 Claims, 16 Drawing Sheets

(56) References Cited

U.S. PATENT DOCUMENTS

| | | |
|---|---|---|
| 8,965,183 B1 | 2/2015 | Kotab |
| 2002/0174430 A1 | 2/2002 | Ellis |
| 2005/0251827 A1 | 7/2005 | Ellis |
| 2007/0274245 A1 | 11/2007 | Balatsos |
| 2010/0153885 A1 | 6/2010 | Yates |
| 2014/0304310 A1 | 10/2014 | Gerbasi, III |

SYSTEMS AND METHODS FOR INTELLIGENTLY MANAGING STORAGE SPACE OCCUPIED BY MEDIA ASSETS

CROSS-REFERENCE TO RELATED APPLICATIONS

This application is a national stage application under 35 U.S.C. § 371 of International Application PCT/US2018/021845, filed Mar. 9, 2018, which is hereby incorporated by reference herein in its entirety.

BACKGROUND OF THE INVENTION

Digital video recorders ("DVRs") allow users to record and playback media assets (e.g., videos, television episodes, movies, etc.). Modern DVR systems make it simple to record entire series and record shows related to other recordings. Some DVRs may automatically record recommended media assets based on shows users of the DVR have watched in the past. Furthermore, a user may desire to record many media assets on a DVR system. And users often record media assets in high quality levels requiring large amounts of storage space. Therefore, modern DVR systems require a large amount of storage space to accommodate recordings based on user's habits to record many media assets in high quality. Even with a large amount of storage space, eventually the DVR will approach its limit on storage space and be unable to record additional media assets without freeing storage space as additional media assets are recorded.

SUMMARY

Accordingly, systems and methods are provided herein for enhancing the management of storage of media assets in DVR systems. For example, while DVR systems make it easy for a user to record media assets to view at a later time, DVR systems have limited storage systems that will eventually fill with recorded media assets if the storage space is not properly managed. Moreover, it is not uncommon for users to record shows in higher quality levels, which occupy additional storage space within DVR systems. Thus, modern DVR systems have created a technological environment that worsens the storage of media assets by storing additional media assets in higher qualities, which quickly fill the storage space of a DVR. And deleting media assets to reclaim storage space is not desirable as the deleted media assets are then no longer available for viewing. To rectify this problem, systems and methods are described herein for intelligently managing recordings of media assets in the storage of the DVR. Systems and methods are described for managing media assets by, for example, altering recordings from higher quality level recordings to lower quality level recordings automatically according to the age of the recording, with the lower quality level recordings requiring less recording space in storage.

In some embodiments, a media guidance application may manage storage space occupied by a media asset by adjusting the quality levels of the media asset over time. When the media guidance application stores the media asset, the media asset is in a format that has a quality level. For example, a user may have a preference for storing media assets in a high quality, e.g., high definition ("HD") or 4K resolution ("4K"), with the media guidance application. But high-quality level media assets require more storage space than storing the same content in a lower quality level such as standard definition ("SD"). The embodiments are described herein with reference to 4K, HD, and SD quality levels. As a person of skill in the art would recognize, the 4K quality level is the highest quality of the three quality levels and requires the most storage space; the HD quality level is the middle quality and requires less space than 4K but more space than SD; and the SD quality level is the lowest quality of the three quality levels and requires the least amount of storage of the three quality levels for the same media asset. While the embodiments described herein refer to 4K, HD, and SD quality, a person of skill in the art would recognize that the systems and methods described herein apply equally to other quality levels such as 8K, 5K, 1080p, 1080i, 720p, 720i, Ultra XGA, Super XGA, XGA, or other suitable qualities for encoding digitally stored media assets such as videos, images, and other media assets. The systems and methods described herein improve and optimize the storage space necessary to store media assets by intelligently managing the formats and quality levels used to store them.

In some embodiments, a media guidance application stores a media asset at a given time. For example, the media guidance application may store a media asset after recording the media asset from a broadcast. Or the media guidance application may store a media asset after downloading the media asset from a remote server. The storage of the media asset may be in response to a user command that initiates the storage of the media asset, or the media guidance application may initiate storage of the media asset based on heuristics and analysis performed on habits of users of the media guidance application. For example, a media guidance application may provide a user with an electronic program guide. During interaction with the user, the media guidance application may receive a command indicating the media guidance application should store an episode of a show, e.g., "Thomas the Train," which is being received at the media guidance application in a format having a high-quality level, e.g., in 4K.

In some embodiments, a media guidance application retrieves a data entry corresponding to the media asset from a database. In some embodiments, the media guidance application houses a local data store that comprises the database. In some embodiments, the database exists on a server remote from the media guidance application. Further, the database may exist in temporary storage, e.g., memory, or in long-term storage, e.g., a file structure on storage such as a hard disk or solid-state disk. The data entry comprises information about the media asset. For example, the data entry may comprise information about the date and time when the media guidance application stored the media asset. Further, the data entry may comprise information identifying the media asset such as title, series name, genre, quality level or levels, date and time when first available, original channel, actors, sport's teams, director, writer, or still other information related to the media asset.

In some embodiments, a media guidance application determines, based on the data entry, a threshold period of time for storing the media asset in the first format. For example, the media guidance application may determine that a copy of a media asset stored in high-quality format, e.g. 4K, should be stored in that format for two weeks. The media guidance application may determine the threshold time period based only on the quality level of the media asset or on additional parameters. The media guidance application may determine the time period based on user preferences for storing quality levels of a media asset. In some embodiments, the media guidance application may determine the threshold time period based on amount of available storage in the storage space associated with the storage of the media asset. In some embodiments, the media guidance application may determine the threshold time period based on a combination of metadata associated with the media asset, user preferences, and/or storage space associated with the storage of the media asset. For example, the media guidance application may determine the media asset is a children's program and is stored in a 4K quality format. The media guidance application may also determine that the user prefers storing children's programs in high quality for an indefinite amount of time, as long as at least 50% of storage space is available; but if less than 50% of storage space is available then the user has a preference for storing children's programs in high quality for two weeks. In some embodiments, the media guidance application determines the time period based on a user associated with the storage of the media asset. For example, the media guidance application may receive interactions from a plurality of users, and some users may be given a higher priority for storage of media assets than other users. The media guidance application may then determine that a first user initiated the storage of a media asset and determine the time period for storing the media asset in the first format based on the associated user. The media guidance application may then store the determined time period in a data entry associated with the media asset.

In some embodiments, a media guidance application detects whether the threshold period of time from when the media guidance application stored the media asset has passed. In response to detecting that the threshold period of time since the given time has passed, the media guidance application alters the media asset. In some embodiments, the media guidance application alters a first portion of the media asset from the first format having the first quality level to a second format having a second quality level. In some embodiments, the media guidance application will alter the stored copy of the media asset from a first format to a second format as a whole. In other words, the media guidance application performs the quality reduction on the entire copy of the media asset that was stored. In some embodiments, the media guidance application will alter a portion of the media asset from a first format to a second format. For example, the media guidance application may determine that a user has watched the first 25% of the media asset and alter the quality level of only the first 25% of the media asset and leave the remaining 75% in the quality level in which the asset was initially stored. In some embodiments, the media guidance application may identify non-substantive portions of a media asset, e.g., credits, announcements, sponsorships, and/or advertisements, and transcode those portions to lower quality to reduce storage space.

In some embodiments, a media guidance application determines a plurality of attributes corresponding to the media asset based on information indicated by the data entry and uses that information to determine a quality level for the media asset. For example, the media guidance application computes an importance of the media asset based on each attribute of the plurality of attributes. For example, the media guidance application may determine that an episode of "Classical Baby" has a low importance because it is a children's program containing animation, which does not require a high amount of quality to preserve fidelity. Furthermore, the media guidance application may consider user preferences in combination with the plurality of attributes to determine the importance of a media asset. For example, user preferences may indicate the media assets associated with specific genres, sports, actions, teams, titles, dates and times, keywords, and/or channels should be computed as more important or less important. In some embodiments, the media guidance application may use information regarding the available storage space associated with the media in combination with other attributes to determine the importance of the media asset. In some embodiments, the media guidance application may have the ability to store portions or entire media assets in a secondary storage, e.g. on a remote server, for later retrieval, and may compute the importance of the media asset based, in part, on whether portions or the entire media asset is available at specific quality levels in secondary storage. In some embodiments, the media guidance application correlates the importance of the media asset with a target quality level, e.g. very important media assets should be held in the highest quality level while low-importance assets are kept in lower quality levels.

In some embodiments, a media guidance application may employ a series of flow control algorithms to determine an importance value from the metadata associated with a media asset. The media guidance application may give a weight to a plurality of attributes and employ the weighted values in a calculation to arrive at the importance value. In some embodiments, the media guidance application may employ multivariate analysis on metadata associated with the media asset to determine the importance value of the media asset. In some embodiments, the media guidance application may analyze the content of the media asset to determine the importance of the media asset. For example, the media guidance application may analyze the content of an episode of "Classical Baby" and determine that the media content would not benefit from high quality storage and, therefore, the importance value of the media asset should be lower. This determination may be because the quality of the media content is such that storage in a high-quality level is inefficient (e.g., perhaps the media asset is an older show that was originally captured in low quality or has artifacts from digitization that make high quality storage inefficient). This determination may be because the content does not lend itself to high quality storage. This determination may be based on training a neural network to identify the target quality level. For example, the media guidance application may track, for one or more users, the quality levels of media assets that the users keep. The media guidance application may extract several pertinent traits of the media assets to train a neural network on the traits that correspond with quality levels. The media guidance application may then use the trained neural network to determine the importance of a media asset in line with the trained network.

In some embodiments, a media guidance application then determines the amount of quality by which to reduce the first quality level as the difference between the first quality level and the target quality level, e.g. the quality reduction is the difference between 4K and HD.

In some embodiments, a media guidance application may calculate an importance value that is used to look up the target quality level from a table that correlates importance values with target quality levels.

In some embodiments, a media guidance application determines an amount of quality by which to reduce the first quality level based, in part, on the importance of the media asset. For example, the media guidance application may determine that an episode of "Classical Baby" stored in 4K is of medium importance. And after two weeks, the media guidance application may determine that the quality of the stored copy should be reduced from 4K to HD.

In another example, the media guidance application may determine that an episode of "Classical Baby" is of low importance, perhaps due to user preferences that children's programs are only kept in high quality for a short duration, and after two weeks the media guidance application may determine the quality level of the "Classical Baby" episode should be reduced from 4K to SD.

In some embodiments, a media guidance application transcodes the first portion of the media asset from the first format to the second format by reducing the first quality level by the determined amount to the second quality level. In some embodiments, the media guidance application performs the transcoding of the first portion of the media asset itself. In other embodiments, the media guidance application may direct the transcoding of the first portion by, for example, sending the first portion of the media asset to a remote server for transcoding and then storing the transcoded asset as received from the remote server.

As described above, the media guidance application may determine to alter the quality level of a portion of a media asset. In some embodiments, the media guidance application detects a time point in the media asset where playback of the media asset was suspended. For example, the media guidance application may receive a command to suspend playback of a media asset (e.g., a pause, an exit, a stop command, or a change channel command). The media guidance application may keep track of the time point when it received a command to suspend playback. In some embodiments, the media guidance application may make a simple determination to transcode the portion of the media asset from a start point of the media asset until the time point at which playback was suspending. In some embodiments, the media guidance application may employ additional intelligence to determine the portion of the media asset to alter. For example, the media guidance application may determine whether playback was suspended close in time to the end of the media asset and, if close enough, determine that the portion of the media asset to transcode should be from the beginning to the end of the media asset even though playback was suspended before the end of the media asset. The media guidance application may determine whether the time point at which playback was suspended occurs within a threshold amount of time from the endpoint of the media asset. For example, the media guidance application may employ a 1-minute threshold, and if playback of the media asset was suspended within 1 minute of the end of the media asset then the media guidance application may consider the portion of the media asset to be from the beginning to the end. When the media guidance application determines that the time point occurs within a threshold amount of time from the endpoint of the media asset, the media guidance application may identify the first portion of the media asset as a portion of the media asset from a start point of the media asset to a time point in the media asset after where playback of the media asset was suspended (e.g., from a start point of the media asset until the end of the media asset). When the media guidance application determines that the time point occurs outside of the threshold amount of time from the endpoint of the media asset (e.g., the suspension occurred more than 1 minute from the end of the media asset), the media guidance application identifies the first portion of the media asset as a portion of the media asset from a start point of the media asset to the time point in the media asset where playback of the media asset was suspended.

In some embodiments, the media guidance application may be hard coded with a threshold. In some embodiments, the media guidance application may store a modifiable threshold to indicate how close in time the suspension must be to the end of the media asset to consider the portion of the media asset to be the whole media asset. The media guidance application may also retrieve the threshold from an external source; e.g., a user profile stored on a remote server may contain the threshold. Further, the media guidance application may allow a user to configure the threshold, e.g., the media guidance application may provide a user interface for setting the threshold.

In some embodiments, the media guidance application further determines the amount of quality by which to reduce the first quality level based on the amount of storage available to the media guidance application. The media guidance application determines a storage threshold associated with storage space required to store the first portion of the media asset. For example, the media guidance application may determine that only 20% of storage space is available and that the storage associated with the media asset needs to be reduced by 25%. In another example, the media guidance application may determine that the media asset currently requires 10 megabytes of storage for every 1 second of content and that the storage requirement needs to be reduced to 8 megabytes of storage for every 1 second of content. The media guidance application then determines a storage threshold quality level associated with the first portion of the media asset. The media guidance application determines storage threshold quality level as a quality level at which storing the first portion of the media asset will not require more storage space than the storage threshold. The media guidance application adjusts the target quality level so the target quality level does not exceed the storage threshold quality level.

In some embodiments, the media guidance application may be hard coded with a storage threshold. In some embodiments, the media guidance application may store a modifiable storage threshold to indicate how much of the storage space should be used to store a media asset or a plurality of media assets. The media guidance application may also retrieve the storage threshold from an external source; e.g., a user profile stored on a remote server may contain the storage threshold. Further, the media guidance application may allow a user to configure the storage threshold, e.g., the media guidance application may provide a user interface for setting the storage threshold.

In some embodiments, the media guidance application further determines the amount of quality by which to reduce the first quality level based on a category of the media asset. The media guidance application may analyze a plurality of attributes to determine a media asset category. In some embodiments, the category may be based on a single attribute of the plurality of attributes while in some embodiments the category is determined from several attributes. The media guidance application correlates the media asset category with a category quality level and adjusts the target quality level based on the category quality level. For example, the media guidance application may determine that a media asset is an action movie rated "R" and that media assets in that category have a category quality level of 4K. It may be that the target quality level, based on other factors, was HD, and the media guidance application may adjust the target quality to 4K based on the category quality level. Going the other direction, the media guidance application may determine that a media asset is a children's program and that media assets in that category have a category quality level of SD. It may be that the target quality level, based on other factors, was HD, and the media guidance application may adjust the target quality to SD based on the category quality level.

In some embodiments, the media guidance application may receive a command that indicates the media guidance application should revert the media asset to the highest possible quality, e.g. from the second lowest quality format to the first highest quality format. For example, the media guidance application may have a media asset stored in SD and receive a command that indicates the media guidance application should store the media asset in 4K. Or the media guidance application may receive an explicit command from the user to revert the media asset to the highest possible quality. Still further, the media guidance application may analyze the amount of available storage space and determine additional storage space is available to allow storage of media assets in a quality level higher than the current level. In this scenario, the media guidance application may issue its own command to revert one or more media assets to higher quality.

In response to receiving the command, the media guidance application determines an availability of a replacement media asset in a format having the first quality level. For example, the media guidance application may determine that a first portion of the media asset is stored in SD and that an upcoming broadcast of the media asset will be in 4K. Therefore, the media guidance application would be able to replace the first portion of the media asset by recording the first portion from the upcoming broadcast. The media guidance application may determine that the first portion of the media asset is available for retrieval from a remote server. In embodiments in which the media guidance application is able to store portions of media assets in secondary storage, the media guidance application may determine that the first portion is available in secondary storage. One of skill in the art would recognize that the replacement asset does not have to be identical to the original media asset. For example, if the original media asset was recorded from broadcast television and the replacement asset is from an upcoming broadcast, it is unlikely that the commercials will be the same, and the media asset may differ in some content. But the replacement media asset will contain content similar to the media asset. Further, if the replacement media asset is of lower quality than the currently stored, transcoded media asset, then there is little reason to retrieve the replacement media asset. Therefore, typically, the replacement media asset will be in a format having a quality level that exceeds the first quality level. The media guidance application obtains the replacement asset based on the determined availability, stores the replacement asset, and removes the first portion of the media asset. In some embodiments, the media guidance will flag the media asset after the higher quality version is retrieved to prevent future quality downgrades.

In some embodiments, the media guidance application manages storage of media assets in second storage. For example, prior to transcoding a portion of a media asset from a first format to a second format, the media guidance application may determine whether or not to store the portion of the media asset in secondary storage. This may allow the media guidance application to revert the portion back to the first format at later time as described above. The media guidance application determines whether to store, in the secondary storage, the first portion of the media asset in the first format. If the media guidance application determines that the first portion of the media asset should be stored in the secondary storage, then the media guidance application stores a first portion of the media asset in the first format in the secondary storage.

In some embodiments, the media guidance application determines whether a secondary storage contains the first portion of the media asset in the first format. For example, the media guidance application may identify the first 25% of a stored media asset should be transcoded from 4K to HD. The media guidance application then checks whether the secondary storage contains the first 25% of the stored media asset in 4K and may receive an indication of whether or not that portion of the media asset is in secondary storage and use that indication to determine, in part, whether to store the first portion in secondary storage. For example, the media guidance application may determine that all of the media asset is stored in 4K and therefore, the first portion, comprising the first 25% of the media asset, is in the secondary storage. In another example, the media guidance application may be checking whether the secondary storage contains a first portion of the media asset in a lower quality level, such as SD quality. The media guidance application may determine that the first portion exists in the secondary storage in a higher quality level, such as 4K. Therefore, the media guidance application may determine that storage of the first portion in a lower quality level, e.g., SD quality, is redundant to the higher quality level storage. Specifically, the media guidance application may determine whether secondary storage contains a third portion of the media asset. In response to determining that secondary storage contains the third portion of the media asset, the media guidance application determines whether a quality level of the third portion of the media asset falls below the first quality level and determines whether the third portion of the media asset comprises similar media content as the first portion of the media asset. For example, if the copy of the media asset from secondary storage and the first portion of the media asset are from two broadcasts, the assets may contain different advertisements but otherwise contain similar content for the main program. If the media guidance application determine that the third portion comprises similar media content as the first portion of the media asset and that the quality level of the third portion of the media asset does not fall below the first quality level (e.g. the content is similar and the secondary storage does not contain a lesser quality copy), the media guidance application may indicate not to store the first portion of the media asset in the first quality level because it is redundant to what is already stored in the secondary storage.

In some embodiments, the media guidance application checks whether the media asset is important enough to store in secondary storage. This importance can be determined in a manner similar to that described with respect to determining quality level based on importance. For example, the media guidance application may compare the determined importance to a secondary storage importance threshold and use that indication to determine, in part, whether to store the first portion in secondary storage.

In some embodiments, the media guidance application managing storage of the media asset in the secondary storage further comprises removing lower quality copies of portions of the media asset from the secondary storage. The media guidance application may identify, in the secondary storage, a third portion of the media asset comprising media content included within the first portion of the media asset. The media guidance application may determine whether a quality level of the third portion of the media asset falls below the first quality level. For example, the media guidance application may determine that the secondary storage contains an SD-quality copy of an episode of "Classical Baby" that is currently in 4K. In response to determining that the quality level of the third portion of the media asset falls below the first quality level, the media guidance application removes the third portion of the media asset from secondary storage.

In some embodiments, the media guidance application may transcode the media asset when storing the media asset to ensure that a media device associated with the storage of the media asset is capable of decoding and playing back the stored media asset. For example, the media guidance application determines a playback capability of a device associated with the media asset. The media guidance application determines a current format of the media asset and determines a playback capability requirement associated with decoding the media asset in the current format. The media guidance application determines whether the playback capability requirement for decoding and playing back the media asset in the first format exceeds the determined playback capability of the media device. If the playback capability requirement exceeds the media device's playback capability, the media guidance application transcodes the media asset from its current format to a format that does not require playback capability that exceeds the media device's determined playback capability. For example, a media device associated with a media asset may not be capable of outputting 4K video but may be capable of outputting HD video. If the media guidance application receives a 4K video associated with that media device, the media guidance application may transcode the media asset from 4K to HD. In another example, a media device may not have enough processing power, speed, memory, or storage to decode 4K video in a manner that allows unbuffered playback of the decoded video. Therefore, the media guidance application may transcode the media asset to a lower quality, e.g. HD or SD video, to ensure the media device has the processing capability to allow for unbuffered playback of the decoded media asset.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
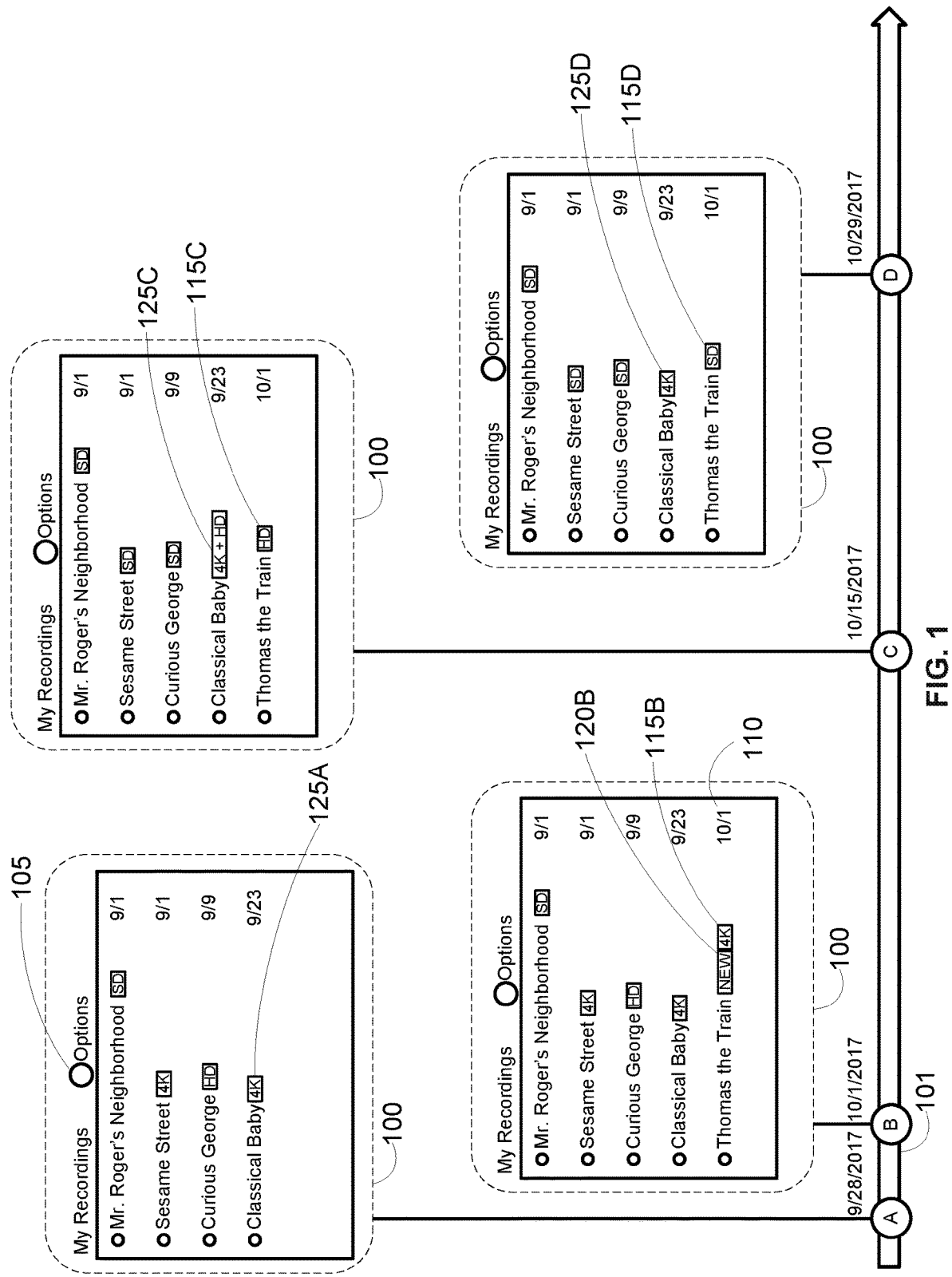
FIG. 1 depicts an illustrative embodiment of an informational display that may be used to provide information to a user regarding the status of media assets stored, in accordance with some embodiments of the disclosure.

FIG. 1 depicts an illustrative embodiment of an informational display that may be used to provide information to a user regarding the status of media assets stored, in accordance with some embodiments of the disclosure. FIG. 1 depicts media guidance application 100, which may be implemented on user equipment by control circuitry. The functionality of user equipment, control circuitry, and the media guidance application is described in further detail with respect to FIGS. 4-7.

FIG. 1 depicts a timeline 101 on the bottom of the figure with four exemplary time points marked A, B, C, and D for easy understanding of embodiments of the invention. As described above, a media guidance application 100 may manage storage space occupied by a media asset by adjusting the quality levels of the media asset over time. In some embodiments, the media guidance application may be executed by control circuitry, such as control circuitry 604. Details related to the media guidance application and control circuitry will be further described below with respect to FIGS. 4-7.

At time point A, dated Sep. 28, 2017, for the purpose of illustration, FIG. 1 illustrates a media guidance application 100, which lists media assets stored in connection with a media guidance application 100. The media guidance application 100 lists 4 media assets which are representative of 4 episodes of different television shows titled: "Mr. Roger's Neighborhood," "Sesame Street," "Curious George," and "Classical Baby". The media guidance application 100 is managing the storage of these media assets in accordance with the techniques described herein. In the media guidance application 100, a date associated with the storage of each media asset is depicted, in Month/Date format, on the far right of media guidance application 100. In this example, September 1st is associated with "Mr. Roger's Neighborhood" and "Sesame Street," September 9th is associated with "Curious George," and September 23rd is associated with "Classical Baby". Furthermore, quality levels associated with each media asset are depicted to the right of the title in a square box with the annotations 4K, HD, and SD. For example, element 125A indicates that "Classical Baby" is stored in 4K quality. Media guidance application 100 also contains an options element 105 that provides access to an informational display used to provide options associated with a media asset as described with further reference to FIG. 2. At time point A in FIG. 1, the media guidance application 100 shows that the media guidance application 100 is storing an episode of "Mr. Roger's Neighborhood" from September 1 in SD quality, an episode of ""Sesame Street"" from September 1 in 4K quality, an episode of Curious George from September 9 in HD quality and an episode of "Classical Baby" from September 23 in 4K quality.

Between time point A and time point B, the media guidance application 100 receives a command indicating the media guidance application 100 should store an episode of another show, e.g., Thomas the Train, which is being received at the media guidance application 100 in a format having a high-quality level, e.g. in 4K. Media guidance application 100 includes a listing for Thomas the Train below "Classical Baby". The Thomas the Train is annotated by a "New" label 120B indicating the listing was newly stored and a 4K label 115B indicating the media asset is stored in 4K quality. The date label 110 indicate that Thomas the Train was stored on October 1st.

The media guidance application 100 may periodically check whether it should manage quality levels of media assets. For example, the media guidance application 100 may perform daily maintenance and during those operations may analyze whether it should alter the quality level of any media assets it has stored. During the management of quality level, the media guidance application 100 retrieves a data entry corresponding to the media asset from a database. For example, when managing the quality of "Classical Baby", the media guidance application 100 retrieves a data entry associated with the episode of "Classical Baby". The data entry comprises information about the media asset. Continuing the "Classical Baby" example, the data entry may indicate the title: "Classical Baby", original television channel: HBO, storage date/time: September 23, format/quality: 4K, genre: Children's Program, sub-genre: the Arts, actors: Susan Sarandon and Langston Hughes, producer: Amy Schatz, writer: Amy Schatz, etc.

The media guidance application 100 may determine, based on the data entry, a threshold period of time for storing the media asset in the first format. Continuing the "Classical Baby" example, the media guidance application 100 may determine that a copy of a media asset stored in high-quality format, e.g. 4K, should be stored in that format for three weeks. The media guidance application 100 may determine the threshold time period based only on the quality level of the media asset or on additional parameters. The media guidance application 100 may determine the time period based on user preferences for storing quality levels of a media asset. In some embodiments, the media guidance application 100 may determine the threshold time period based on amount of available storage in the storage space associated with the storage of the media asset. In some embodiments, the media guidance application 100 may determine the threshold time period based on a combination of metadata associated with the media asset, user preferences, and/or storage space associated with the storage of the media asset. For example, the media guidance application 100 may determine the media asset is a children's program and is stored in a 4K quality format. The media guidance application 100 may also determine that the user prefers storing children's programs in high quality for an indefinite amount of time, as long as at least 50% of storage space is available; but if less than 50% of storage space is available, then the user has a preference for storing children's programs in high quality for three weeks. In some embodiments, the media guidance application 100 determines the time period based on a user associated with the storage of the media asset. For example, the media guidance application 100 may receive interactions from a plurality of users and some users may be given a higher priority for storage of media assets than other users. The media guidance application 100 may then determine that a first user initiated the storage of a media asset and determine the time period for storing the media asset in the first format based on the associated user. The media guidance application 100 may then store the determined time period in a data entry associated with the media asset.

As an example, on the morning of October 15, the media guidance application 100 may manage the quality levels of stored media assets. During the management of quality levels, the media guidance application 100 detects whether the threshold period of time from when the media guidance application 100 stored the media asset has passed. In the "Classical Baby" example, the media guidance application 100 detects that the three-week threshold has passed since September 23rd. In response to detecting that the threshold period of time since the given time has passed, the media guidance application 100 alters the media asset. In some embodiments, the media guidance application 100 alters a first portion of the media asset from the first format having the first quality level to a second format having a second quality level. In some embodiments, the media guidance application 100 will alter the stored copy of the media asset from a first format to a second format as a whole. In other words, the media guidance application 100 performs the quality reduction on the entire copy of the media asset that was stored. In some embodiments, the media guidance application 100 will alter a portion of the media asset from a first format to a second format. For example, the media guidance application 100 may determine that a user has watched the first 25% of the media asset and alter the quality level of only the first 25% of the media and leave the remaining 75% in the quality level that was initially stored. Continuing with the "Classical Baby" example, the media guidance application 100 may determine that the first 10 minutes of "Classical Baby" was already watched by the user. In accordance with the processes described herein, the media guidance application 100 may determine to alter the format of the first 10 minutes of "Classical Baby" from 4K quality to HD quality.

The media guidance application 100 may determine a plurality of attributes corresponding to the media asset based on information indicated by the data entry and use that information to determine quality level for the media asset. For example, the media guidance application 100 may compute an importance of the media asset based on each attribute of the plurality of attributes. For example, the media guidance application 100 may determine that an episode of "Classical Baby" has a low importance because it is a children's program containing animation which does not require a high amount of quality to preserve fidelity. In some embodiments, the media guidance application 100 may consider user preferences in combination with the plurality of attributes to determine the importance of a media asset. For example, user preferences may indicate the media assets associated with specific genres, sports, actions, teams, titles, dates and times, keywords, and/or channels should be computed as more important or less important. In some embodiments, the media guidance application 100 may use information regarding the available storage space associated with the media in combination with other attributes to determine the importance of the media asset. In some embodiments, the media guidance application 100 may have the ability to store portions or entire media assets in a secondary storage, e.g. on a remote server, for later retrieval and may compute the importance of the media asset based, in part, on whether portions or the entire media asset is available at specific quality levels in secondary storage. In some embodiments, the media guidance application 100 correlates the importance of the media asset with a target quality level, e.g. very important media assets should be held in the highest quality level while low-importance assets are kept in lower quality levels.

The media guidance application 100 may employ a series of flow control algorithms to determine an importance value from the metadata associated with a media asset. The media guidance application 100 may give a weight to a plurality of attributes and employ the weighted values in a calculation to arrive at the importance value. In some embodiments, the media guidance application 100 may employ multivariate analysis on metadata associated with the media asset to determine the importance value of the media asset. In some embodiments, the media guidance application 100 may analyze the content of the media asset to determine the importance of the media asset. For example, the media guidance application 100 may analyze the content of an episode of "Classical Baby" and determine that the media content would not benefit from high quality storage and, therefore, the importance of the media asset should be lower. This determination may be because the quality of the media content is such that storage in a high-quality level is inefficient (e.g., perhaps the media asset is an older show that was originally captured in low quality or has artifacts from digitization that make high quality storage inefficient). This determination may be because the content does not lend itself to high quality storage. This determination may be based on training a neural network to identify the target quality level. For example, the media guidance application 100 may track, for one or more users, the quality levels of media assets that the users keep. The media guidance application 100 may extract several pertinent traits of the media assets to train a neural network on the traits that correspond with quality levels. The media guidance application 100 may then use the trained neural network to determine the importance of a media asset in line with the trained network.

In some embodiments, the media guidance application 100 computes the importance of the media asset according to the following technique. The media guidance application 100 evaluates the attributes of the media asset to determine weighted attribute scores. The media guidance application 100 combines the weighted attribute scores to produce a normalized importance score and correlates the normalized importance score with a recommended target quality value. For example, the media guidance application 100 may consider the following attributes in computing a normalized importance score: genre, run-length, current quality level, original channel, title, actors, director, writer, and original date/time. The media guidance application 100 may hold an importance table of attribute types, attributes, and weighted scores, such as the following exemplary importance table.

TABLE 1

Exemplary Importance Table

| Type | Attribute | Weighted Score |
|---|---|---|
| Genre | Comedy | .1 |
| | Kids | .5 |
| | Action | .7 |
| | Nature | .9 |
| Run-Length | ≤30 minutes | .9 |
| | >30 min. & ≤60 min. | .5 |
| | >60 min. | 0 |
| Current Quality Level | 4K | .1 |
| | HD | .5 |
| | SD | .9 |
| Original Channel | HBO | .9 |
| | ESPN | .1 |
| | Nickelodeon | −.2 |
| Title | Hockey | .9 |
| Keywords | Animated | −.1 |

In this example, the importance score of a media asset may be calculated from the weighted scores. In some embodiments, the importance score may be the average of the weighted scores. Taking the example of "Classical Baby", the media guidance application 100 determines that the media asset has the following attributes: Kids genre, 35 minutes runtime, 4K quality level, aired on HBO, and animated. Using the values from the exemplary importance table, the media guidance application 100 calculates an importance value as (0.5+0.5+0.1+0.9+−0.1)/5=0.38.

In some embodiments, the media guidance application 100 correlates the importance score of the media asset with a target quality level. For example, the media guidance application 100 may correlate media assets according to the exemplary importance score quality level table.

TABLE 2

Exemplary Importance Score Quality Level Table

| Importance Score | Target Quality Level |
|---|---|
| ≤.33 | SD |
| >.33 & ≤.66 | HD |
| >.66 | 4K |

In the "Classical Baby" example where the media asset has an importance score of 0.38, the media guidance application 100 determines the target quality level to be HD quality.

In some embodiments, the media guidance application 100 obtains a user profile that contains preference information and uses the user's preference to determine the importance of a media asset. For example, the user's profile may indicate that the user has a preference for children's programs, and therefore, the media guidance application may give media assets that are children's programs a higher importance based on those preferences and maintain media assets associated with those preferences in higher quality levels.

In some embodiments, the media guidance application 100 may compare the importance scores of a plurality of media assets to make a relative importance determination. For example, the media guidance application 100 may compare importance scores from media assets having the same current quality level to determine which of those assets should have its quality downgraded.

The media guidance application may obtain the exemplary tables using several mechanisms. In some embodiments, the media guidance application may be hard coded with the tables. In some embodiments, the media guidance application may store modifiable tables. The media guidance application may also retrieve the tables from an external source; e.g., a user profile stored on a remote server may contain the tables. Further, the media guidance application may allow a user to configure the tables, e.g., the media guidance application may provide a user interface for setting up the tables.

After the media guidance application 100 determines a target quality level for a given media asset, the media guidance application 100 may determine the amount of quality by which to reduce the first quality level as the difference between the first quality level and the target quality level. Continuing the "Classical Baby" example, the quality reduction is the difference between 4K (the current quality level of the media asset) and HD (the target quality level). The media guidance application 100 uses the amount of quality by which to reduce the first quality level to transcode the media asset from a first format to a second format. In some embodiments, the media guidance application 100 performs the transcoding of the first portion of the media asset itself. In some embodiments, the media guidance application 100 may direct the transcoding of the first portion by, for example, sending the first portion of the media asset to a remote server for transcoding and then storing the transcoded asset as received from the remote server.

In some embodiments, the media guidance application 100 may determine to alter the quality level of a portion of a media asset. For example, the media guidance application 100 may detect a time point in the media asset where playback of the media asset was suspended. Continuing with the "Classical Baby" example, the media guidance application 100 may determine that the first 10 minutes of "Classical Baby" were already watched by the user. The media guidance application 100 keeps track of the 10-minute mark from "Classical Baby" to determine a portion of the media asset to transcode. In this example, the media guidance application 100 identifies the first 10 minutes of "Classical Baby" to be transcoded from 4K to HD and identifies the remaining portion of "Classical Baby" to stay in 4K.

Continuing with reference to FIG. 1, between time point B and time point C, the media guidance application 100 has managed the quality levels of the media assets according to the embodiments described herein. The media guidance application 100 may show the result of the management of quality levels on the media asset at time point C, dated Oct. 15, 2017. At time point C, the media guidance application 100 may show that the media guidance application 100 is storing the episode of "Mr. Roger's Neighborhood" from September 1 in SD quality, the episode of "Sesame Street" from September 1 in SD quality, the episode of Curious George from September 9 in SD quality, the episode of "Classical Baby" from September 23 in a mixed quality of "4K+HD" (which indicates that one portion of the episode is in 4K quality and one portion of the episode is in HD quality), and the Thomas the Train episode from October 1 in HD quality. In some embodiments, the management of quality levels between time point B and time point C occurs as described here.

In some embodiments, the media guidance application 100 may receive a command that indicates the media guidance application 100 should revert the media asset to the highest possible quality, e.g. from the second lowest quality format to the first highest quality format. For example, the media guidance application 100 may have stored "Classical Baby" in a mixed "4K+HD" quality levels at time point C in FIG. 1. For example, between time point C and time point D, the media guidance application 100 may receive a command that indicates the media guidance application 100 should store a media asset in higher quality.

Figure 2:
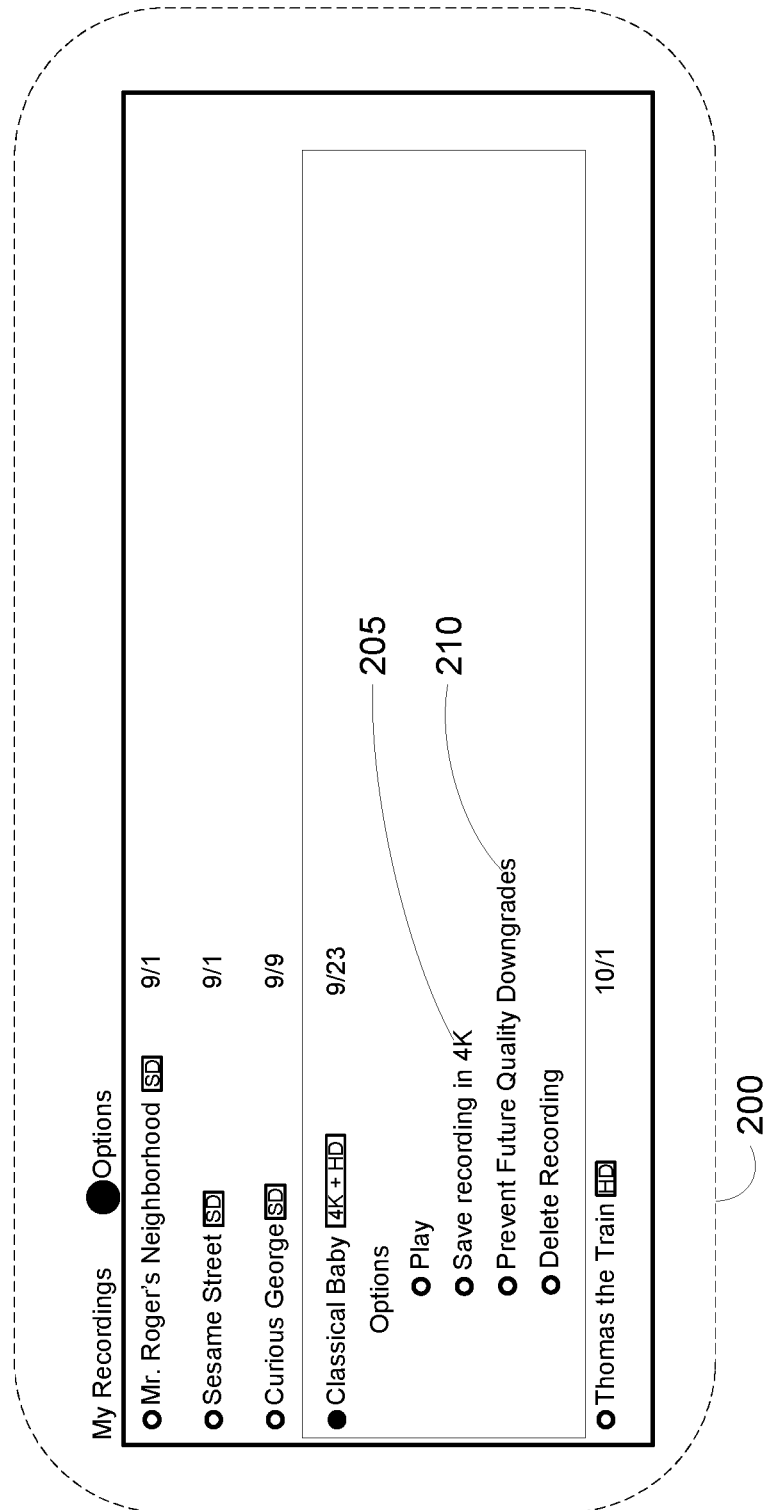
FIG. 2 depicts an illustrative embodiment of an informational display that may be used to provide options to a user regarding the status of a media asset stored, in accordance with some embodiments of the disclosure.

In some embodiments, the media guidance application 100 may receive a set of user interactions invoking the options user element 105 with respect to the "Classical Baby" media asset and the options user element 105 brings up user interface elements from FIG. 2.

FIG. 2 depicts an illustrative embodiment of an informational display that may be used to provide options to a user regarding the status of a media asset stored in accordance with some embodiments of the disclosure. FIG. 2 depicts media guidance application 200 which shows a menu of stored media assets associated with the media guidance application 100. Once the options menu is invoked, the media guidance application 100 presents a series of options associated with the selected media. In FIG. 2, the "Classical Baby" media asset is selected and four options are presented in media guidance application 200: Play, Save Recording in 4K 205, Prevent Future Quality Downgrades 210, and Delete Recording.

In response to receiving a command associated with the option to Save Recording in 4K 205, the media guidance application 100 reverts the media asset to the 4K quality level. The media guidance application 100 determines whether the first 10 minutes of the "Classical Baby" media asset is available in 4K quality level. For example, the media guidance application 100 may determine that an upcoming broadcast of "Classical Baby" is in 4K and that the first ten minutes of the show will be available for storage to replace the HD portion of the stored media asset. Therefore, the media guidance application 100 would be able to replace the first portion of "Classical Baby" by recording the first portion from the upcoming broadcast. The media guidance application 100 may also determine that the first 10 minutes of the "Classical Baby" media asset is available in 4K quality for retrieval from a remote server and that the HD portion of the stored media asset can be replaced with the first portion for a remote server. In some embodiments, in which the media guidance application 100 is able to store portions of media assets in secondary storage, the media guidance application 100 may determine that the first 10 minutes of "Classical Baby" is available in secondary storage. One of skill in the art would recognize that the replacement asset does not have to be identical to the original media asset. For example, if "Classical Baby" was recorded from a broadcast that contained advertisement and the replacement asset is from an upcoming broadcast with advertisement, it is unlikely that the commercials will be the same. Therefore, the upcoming version of the "Classical Baby" media asset may differ from the stored version in some content such as advertisements. But the replacement media asset will contain content similar to the stored media asset in that the content of the show will be substantially identical in content if not in quality. Further, if the replacement media asset is of lower quality than the currently stored, transcoded media asset, then there is little reason to retrieve the replacement media asset. Therefore, typically the replacement media asset will identify as being in a format having a quality level that exceeds the first quality level. The media guidance application 100 obtains the replacement asset based on the determined availability, stores the replacement asset, and removes the first portion of the media asset.

In some embodiments, the media guidance application 100 may be capable of receiving a user interaction invoking an option to Prevent Future Quality Downgrades 210. In response to interactions invoking this option, the media guidance application 100 may store an attribute in association with "Classical Baby" that indicates that the media guidance application 100 should not alter the format of the stored media asset in a way that degrades the quality level of the media asset in the future. During management of the storage of media assets, the media guidance application 100 may use this information when making a determination of whether or not to alter the format of the media asset in a manner that impacts the quality of stored media asset.

Returning to FIG. 1, time point D shows media guidance application 100 dated on Oct. 29, 2017. Time point D is an example of a time point that occurs after the media guidance application 100 may receive a command to revert a media asset back to a high-quality level. Using the example of "Classical Baby" and FIG. 2, the media guidance application 100 has reverted "Classical Baby" from being stored in multiple qualities, e.g., 4K+HD quality levels, to being stored in its original high-quality level format, 4K, as annotated by label 4K 125D. The media guidance application 100 has also further managed the quality levels of the media assets shown between time point C and time point D. As shown in media guidance application 100, the quality level of the Thomas the Train media asset has been degraded from HD at time point C to SD at time point D in accordance with the techniques described above. At time point D, the media guidance application 100 may show that the media guidance application 100 is storing the episode of "Mr. Roger's Neighborhood" from September 1 in SD quality, the episode of "Sesame Street" from September 1 in SD quality, the episode of Curious George from September 9 in SD quality, the episode of "Classical Baby" from September 23 in 4K quality, and the Thomas the Train episode from October 1 in HD quality.

In some embodiments, the media guidance application 100 manages storage of media assets in second storage. For example, prior to transcoding a portion of a media asset from a first format to a second format, the media guidance application 100 may determine whether or not to store the portion of the media asset in secondary storage. This may allow the media guidance application 100 to revert the portion back to the first format at a later time as described above. The media guidance application 100 determines whether to store, in the secondary storage, the first portion of the media asset in the first format. If the media guidance application 100 determines that the first portion of the media asset should be stored in the secondary storage, then the media guidance application 100 stores a first portion of the media asset in the first format in a secondary storage.

Figure 3:
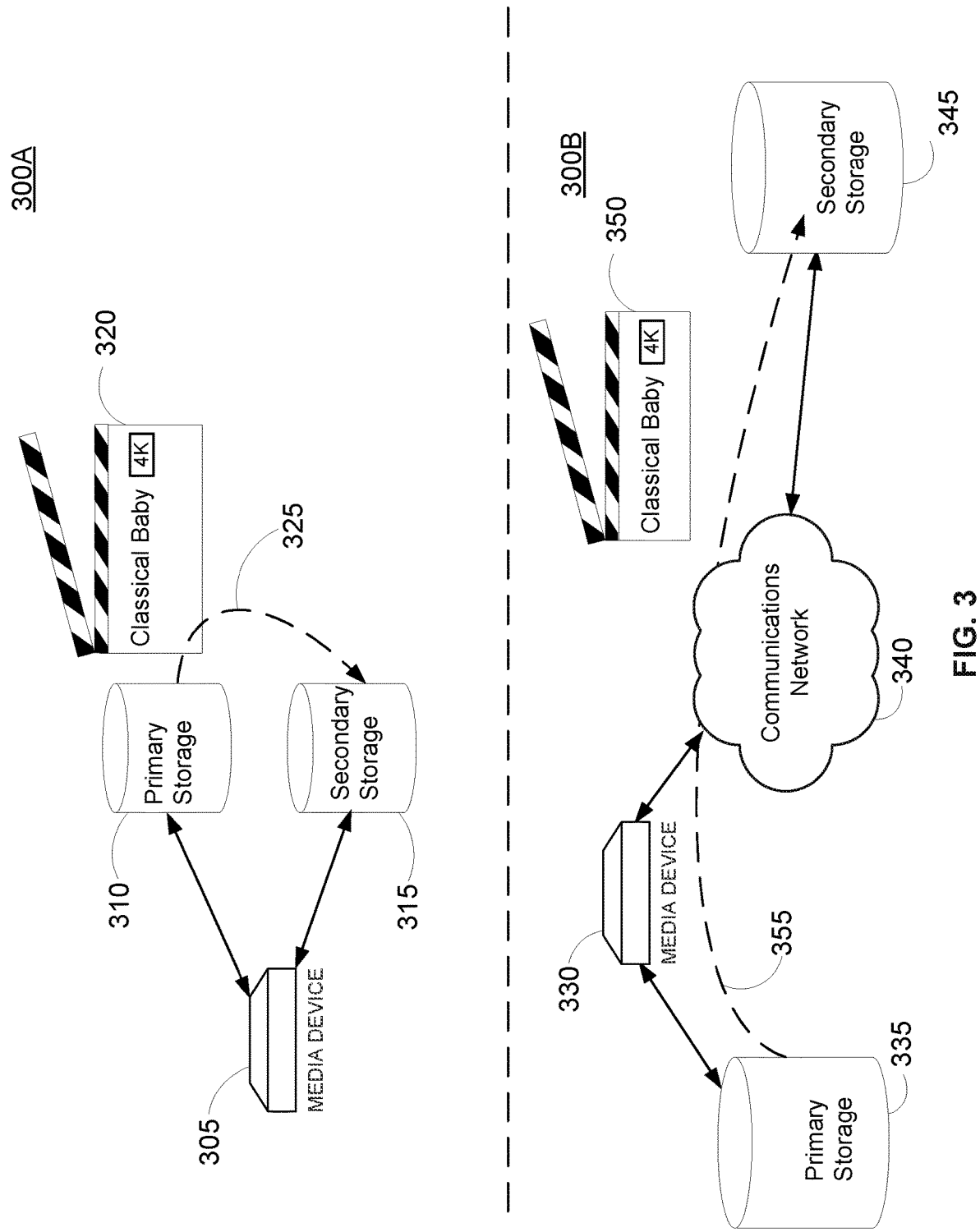
FIG. 3 depicts a visualization of managing storage of media assets in primary storage and secondary storage in accordance with some embodiments of the disclosures.

FIG. 3 depicts visualizations of managing storage of media assets in primary storage and secondary storage in accordance with some embodiments of the disclosures.

The top portion of FIG. 3 illustrates a system 300A for managing storage of media assets by copying portions of media assets from a primary storage 310 associated with a media device 305 to a secondary storage 315 associated with the media device 305. For example, prior to transcoding a portion of a media asset from a first format to a second format, e.g., before transcoding a portion of "Classical Baby" from 4K to HD, the media guidance application 100 may determine whether or not to store the portion of the media asset 320 in secondary storage 315.

In some embodiments, the media guidance application 100 determines whether secondary storage 315 contains the first portion of the media asset in the first format 320. For example, prior to transcoding the first 10 minutes of "Classical Baby" from 4K to HD, the media guidance application 100 may check whether the secondary storage 315 contains the first 10 minutes of "Classical Baby" in 4K. The media guidance application 100 receives an indication of whether or not the first 10 minutes of "Classical Baby" 320 is in secondary storage 315 and use that indication to determine, in part, whether to store the first 10 minutes of "Classical Baby" 320 in secondary storage 315 in 4K quality levels. If the media guidance application 100 determines that the first 10 minutes of "Classical Baby" 320 is stored in the secondary storage 315 in a 4K quality level (or in a higher quality level) then storage of the portion of the media asset is redundant. Specifically, the media guidance application 100 may determining whether secondary storage 315 contains a third portion of the media asset 320. In response to determining that secondary storage 320 contains the third portion of the media asset 320, the media guidance application 100 determines whether a quality level of the third portion of the media asset falls below the first quality level, e.g. 4K, and determines whether the third portion of the media asset comprises similar media content as the first portion of the media asset, e.g., as the first 10 minutes of the media asset. If the media guidance application 100 determines that third portion comprises similar media content as the first portion of the media asset and that the quality level of the third portion of the media asset does not fall below the first quality level (e.g. the content is similar and the secondary storage does not contain a lesser quality copy), the media guidance application 100 may indicate not to store the first portion of the media asset 320 in the first quality level because it is redundant to what is already stored in the secondary storage 315.

The bottom portion of FIG. 3 illustrates a system 300B for managing storage of media assets by copying portions of media assets from a primary storage 335 associated with a media device 330 to a secondary storage 345 associated with the media device 330. System 300B manages storage of portions of media assets in secondary storage 315 using the techniques described herein but with the secondary storage 345 coupled to the media device 330 across a communications network 340. For example, the secondary storage 345 may be housed in a remote server that is coupled to a media device 330 via an Internet connection.

As noted above, the media guidance application described herein provides user interface elements that work in conjunction with management of storage of media assets including management of the quality levels used to store those media assets. Consequently, many users desire a form of media guidance through an interface that allows users to efficiently navigate content selections and easily identify content that they may desire interaction. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 4:
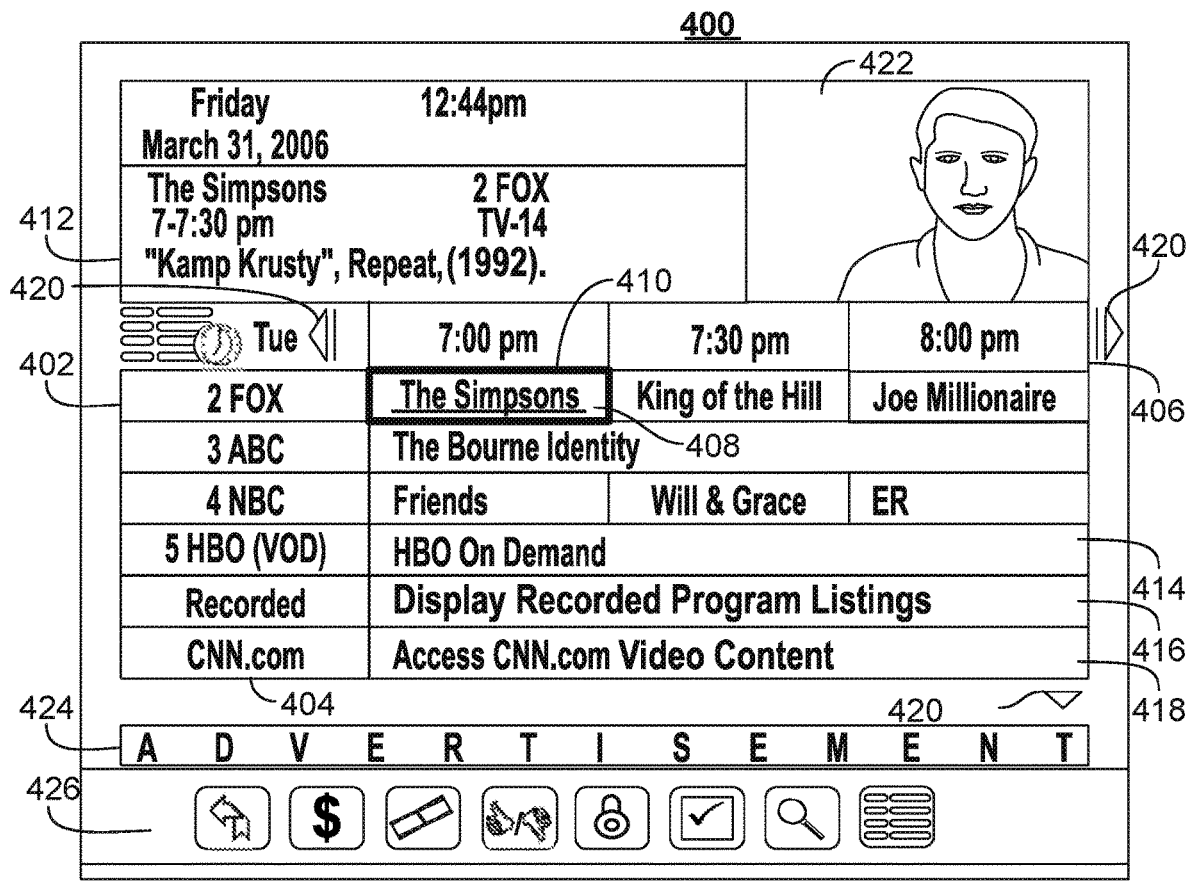
FIG. 4 shows an illustrative embodiment of a display screen that may be used to provide media guidance application listings and other media guidance information, in accordance with some embodiments of the disclosure.
Figure 5:
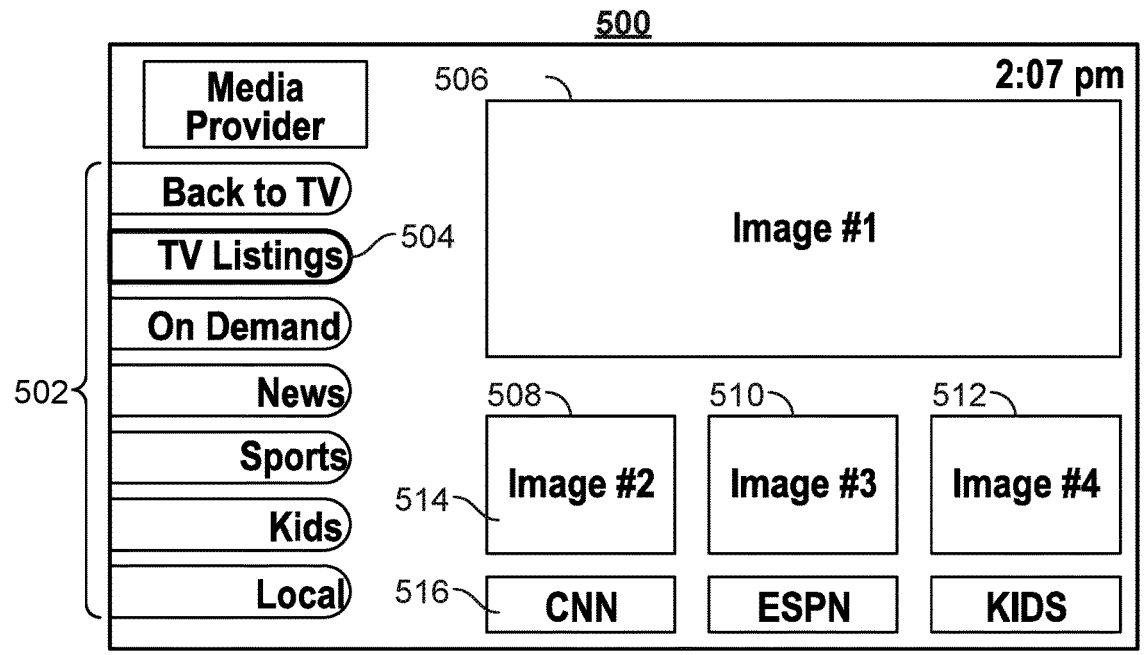
FIG. 5 shows another illustrative embodiment of a display screen that may be used to provide media guidance application listings, in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
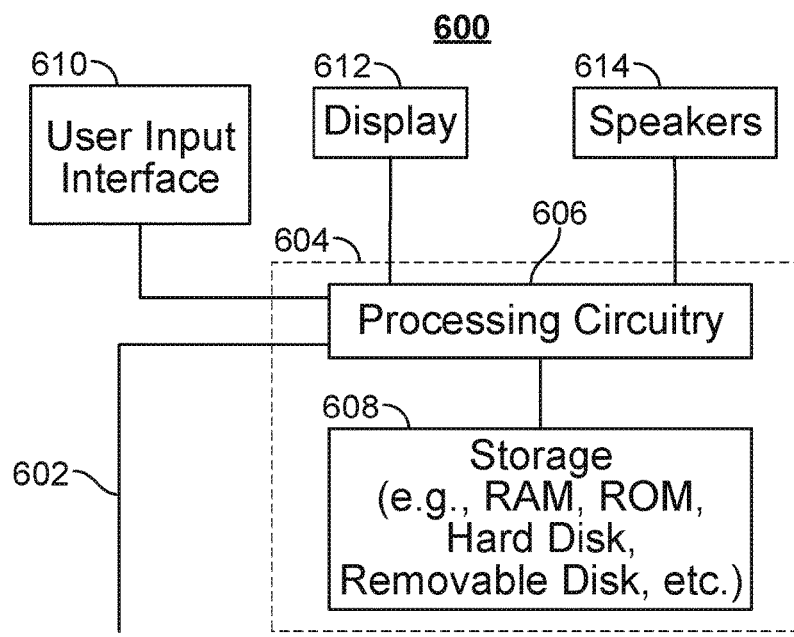
FIG. 6 is a block diagram of an illustrative user equipment (UE) device, in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
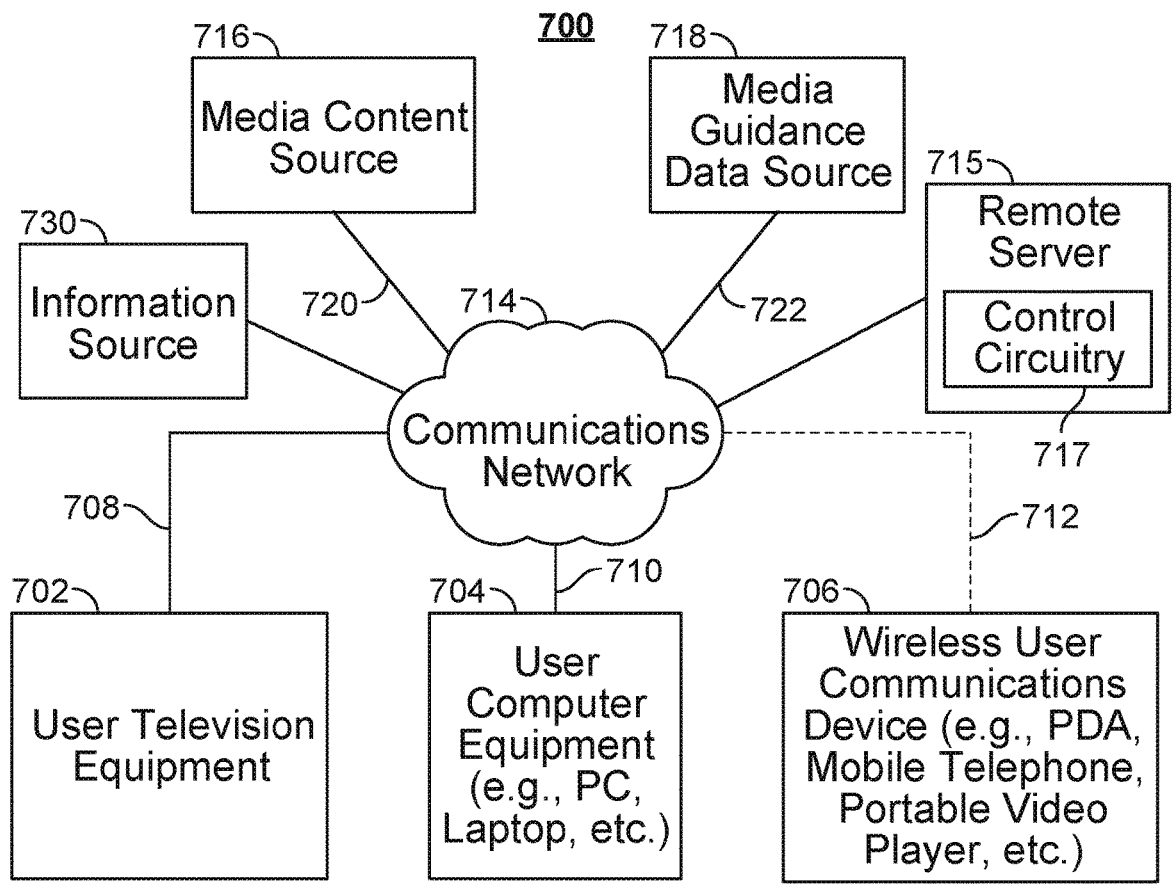
FIG. 7 is a block diagram of an illustrative media system, in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
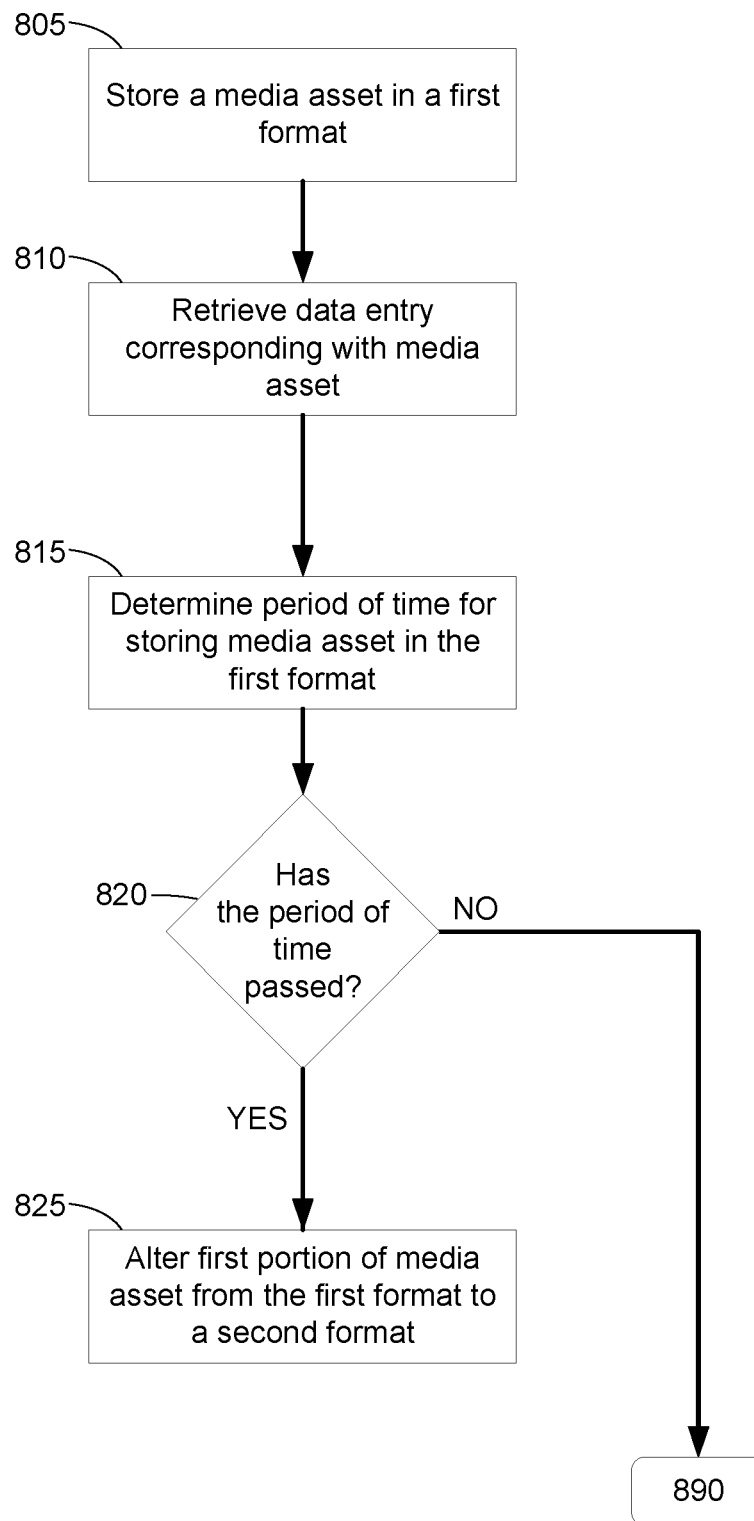
FIG. 8 depicts an illustrative flowchart of a process for managing the quality levels and formats used to store media assets, in accordance with some embodiments of the disclosure.

FIG. 8 depicts an illustrative flowchart of a process for managing the quality levels and formats used to store media assets, in accordance with some embodiments of the disclosure. Process 800 may be executed by control circuitry 604 (e.g., in a manner instructed to control circuitry 604 by the media guidance application). Control circuitry 604 may be part of user equipment (e.g., a user equipment generating media guidance application 105, which may have any or all of the functionality of user television equipment 702, user computer equipment 704, and/or wireless communications device 706), or of a remote server separated from the user equipment by way of communication network 714, or distributed over a combination of both.

Process 800 begins at 805, where control circuitry 604 stores, at a given time, the media asset in a first format having a first quality level. For example, control circuitry 604 may receive a media asset from media content source 716 and store the media asset in storage 608.

Process 800 continues with control circuitry 604 retrieving, from a data source, a data entry corresponding to the media asset at 810. For example, control circuitry 604 may retrieve a data entry from storage 608 or retrieve the data entry from a remote data source such as media content source 716, media guidance data source 718 or remote server 715.

At 815, control circuitry 604 determines, based on the data entry, a threshold period of time for storing the media asset in the first format. For example, the control circuitry 604 may determine that a copy of a media asset stored in high-quality format, e.g. 4K, should be stored in that format for two weeks. The control circuitry 604 may determine the threshold time period based only on the quality level of the media asset or on additional parameters. The control circuitry 604 may determine the time period based on user preferences for storing quality levels of a media asset. In some embodiments, the control circuitry 604 may determine the threshold time period based on amount of available storage in the storage space associated with the storage of the media asset. In some embodiments, the control circuitry 604 may determine the threshold time period based on a combination of metadata associated with the media asset, user preferences, and/or storage space associated with the storage of the media asset. For example, the control circuitry 604 may determine the media asset is a children's program and is stored in a 4K quality format. The control circuitry 604 may also determine that the user prefers storing children's programs in high quality for an indefinite amount of time, as long as at least 50% of storage space is available; but if less than 50% of storage space is available, then the user has a preference for storing children's programs in high quality for two weeks. In some embodiments, the control circuitry 604 determines the time period based on a user associated with the storage of the media asset. For example, the control circuitry 604 may receive interactions from a plurality of users, and some users may be given a higher priority for storage of media assets than other users. The control circuitry 604 may then determine that a first user initiated the storage of a media asset and determine the time period for storing the media asset in the first format based on the associated user. The control circuitry 604 may then store the determined time period in a data entry associated with the media asset.

Process 800 continues at 820 where control circuitry 604 detects whether the threshold period of time since the given time has passed. If the control circuitry 604 determines that the threshold has not passed, process 800 concludes at step 890. If control circuitry 604 detects that the threshold period of time since the given time has passed, the control circuitry 604 continues process 800 at 825 by altering a first portion of the media asset from the first format having the first quality level to a second format having a second quality level. In some embodiments, the control circuitry 604 alters a first portion of the media asset from the first format having the first quality level to a second format having a second quality level. In some embodiments, the control circuitry 604 will alter the stored copy of the media asset from a first format to a second format as a whole. In other words, the control circuitry 604 performs the quality reduction on the entire copy of the media asset that was stored. In some embodiments, the control circuitry 604 will alter a portion of the media asset from a first format to a second format. For example, the control circuitry 604 may determine that a user has watched the first 25% of the media asset and alter the quality level of only the first 25% of the media and leave the remaining 75% in the quality level that was initially stored.

In some embodiments, the control circuitry 604 may identify non-substantive portions of a media asset, e.g., credits, announcements, sponsorships, and/or advertisements, and transcode those portions to lower quality to reduce storage space.

Figure 9:
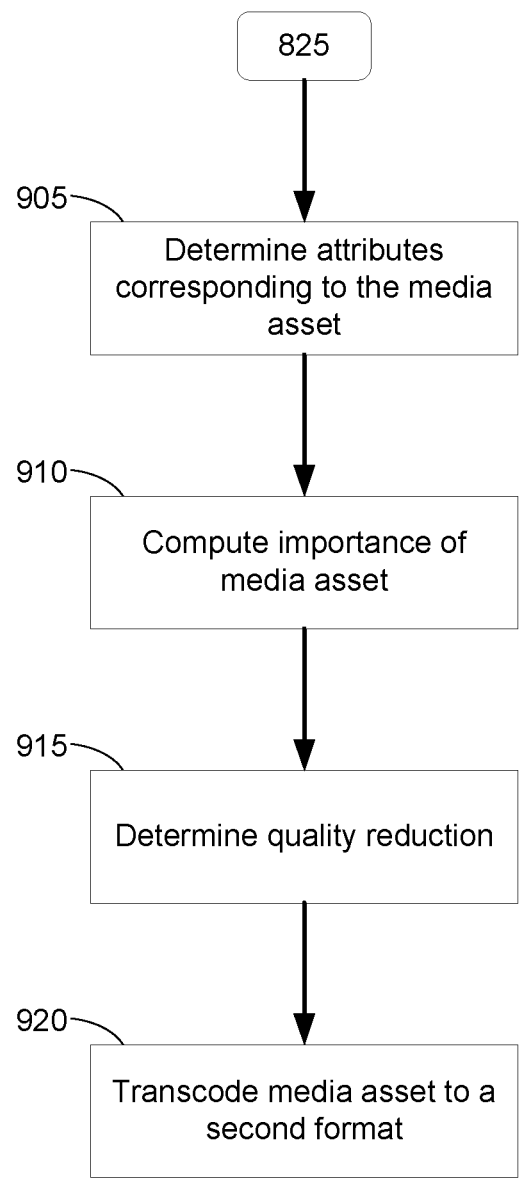
FIG. 9 depicts an illustrative flowchart of a process for altering the format of a media asset, in accordance with some embodiments of the disclosure.

FIG. 9 depicts an illustrative flowchart of a process for altering the format of a media asset, in accordance with some embodiments of the disclosure. Process 900 further depicts a method for altering a media asset, for example expanding from step 825 from FIG. 8. Process 900 begins at 905 where control circuitry 604 determines a plurality of attributes corresponding to the media asset based on information indicated by the data entry. At 910, the control circuitry 604 continues process 900 by computing an importance of the media asset based on each attribute of the plurality of attributes. For example, the control circuitry 604 may determine that an episode of "Classical Baby" has a low importance because it is a children's program containing animation which does not require a high amount of quality to preserve fidelity. Furthermore, the control circuitry 604 may consider user preferences in combination with the plurality of attributes to determine the importance of a media asset. For example, user preferences may indicate the media assets associated with specific genres, sports, actions, teams, titles, dates and times, keywords, and/or channels should be computed as more important or less important. In some embodiments, the control circuitry 604 may use information regarding the available storage space associated with the media in combination with other attributes to determine the importance of the media asset. In some embodiments, the control circuitry 604 may have the ability to store portions or entire media assets in a secondary storage, e.g. on a remote server, for later retrieval and may compute the importance of the media asset based, in part, on whether portions or the entire media asset is available at specific quality levels in secondary storage. In some embodiments, the control circuitry 604 correlates the importance of the media asset with a target quality level, e.g. very important media assets should be held in the highest quality level while low-importance assets are kept in lower quality levels.

The control circuitry 604 may employ a series of flow control algorithms to determine an importance value from the metadata associated with a media asset. The control circuitry 604 may give a weight to a plurality of attributes and employ the weighted values in a calculation to arrive at the importance value. In some embodiments, the control circuitry 604 may employ multivariate analysis on metadata associated with the media asset to determine the importance value of the media asset. In some embodiments, the control circuitry 604 may analyze the content of the media asset to determine the importance of the media asset. For example, the control circuitry 604 may analyze the content of an episode of "Classical Baby" and determine that the media content would not benefit from high quality storage and, therefore, the importance of the media asset should be lower. This determination may be because the quality of the media content is such that storage in a high-quality level is inefficient (e.g., perhaps the media asset is an older show that was originally captured in low quality or has artifacts from digitization that make high quality storage inefficient). This determination may be because the content does not lend itself to high quality storage. This determination may be based on training a neural network to identify the target quality level. For example, the control circuitry 604 may track, for one or more users, the quality levels of media assets that the users keep. The control circuitry 604 may extract several pertinent traits of the media assets to train a neural network on the traits that correspond with quality levels. The control circuitry 604 may then use the trained neural network to determine the importance of a media asset in line with the trained network.

Process 900 continues at 915, where the control circuitry 604 determines an amount of quality by which to reduce the first quality level based, in part, on the importance of the media asset. For example, the control circuitry 604 may calculate an importance value that is used to look up the target quality level from a table that correlates importance values with target quality levels. At 920, the control circuitry 604 transcodes the first portion of the media asset from the first format to the second format by reducing the first quality level by the determined amount to the second quality level.

Figure 10:
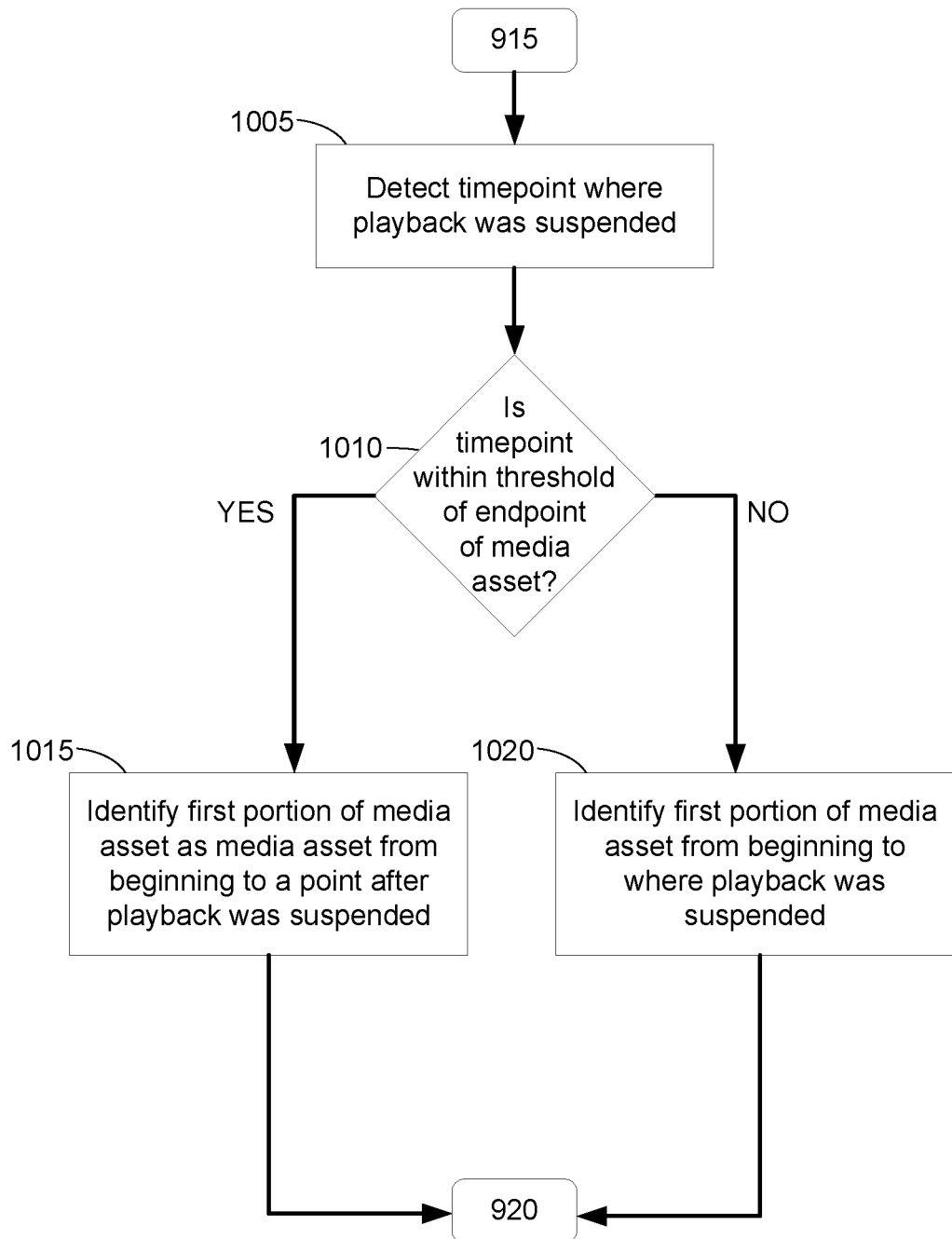
FIG. 10 depicts an illustrative flowchart of a process for identifying a portion of a media asset to be altered, in accordance with some embodiments of the disclosure.

FIG. 10 depicts an illustrative flowchart of a process for identifying a portion of a media asset to be altered, in accordance with some embodiments of the disclosure. Process 1000 begins prior to transcoding a media asset, for example before step 920 of FIG. 9, and may be used, especially, in embodiments where the control circuitry 604 is capable of transcoding portions of a media asset. Process 1000 begins at 1005, where control circuitry 604 detects a time point in the media asset where playback of the media asset was suspended. For example, the control circuitry 604 may receive a command to suspend playback of a media asset (e.g., a pause, an exit, a stop command, or change channel command). The control circuitry 604 may keep track of the time point when it received a command to suspend playback, for example in a date entry associated with the media asset as described above.

At 1010, control circuitry 604 determines whether the time point occurs within a threshold amount of time from the endpoint of the media asset. In some embodiments, the control circuitry 604 may make a simple determination to transcode the portion of the media asset from the beginning of the media asset until the time point at which playback was suspended. In some embodiments, the control circuitry 604 may employ additional intelligence to determine the portion of the media asset to alter. For example, the control circuitry 604 may determine whether playback was suspended close in time to the end of the media asset and, if close enough, determine that the portion of the media asset to transcode should be from the beginning to the end of the media asset, even though playback was suspended before the end of the media asset. The control circuitry 604 may determine whether the time point at which playback was suspended occurs within a threshold amount of time from the endpoint of the media asset. For example, the control circuitry 604 may employ a 1-minute threshold, and if playback of the media asset, was suspended within 1 minute of the end of the media asset then the control circuitry 604 may consider the portion of the media asset to be from the beginning to the end.

If the time point occurs within a threshold amount of time from the endpoint of the media asset, the control circuitry 604 continues process 1000 at 1015 by identifying the first portion of the media asset as a portion of the media asset from a start point of the media asset to a time point in the media asset after where playback of the media asset was suspended. If the time point occurs outside of the threshold amount of time from the endpoint of the media asset, process 1000 continues at 1020 where control circuitry 604 identifies the first portion of the media asset as a portion of the media asset from a start point of the media asset to the time point in the media asset where playback of the media asset was suspended.

Figure 11:
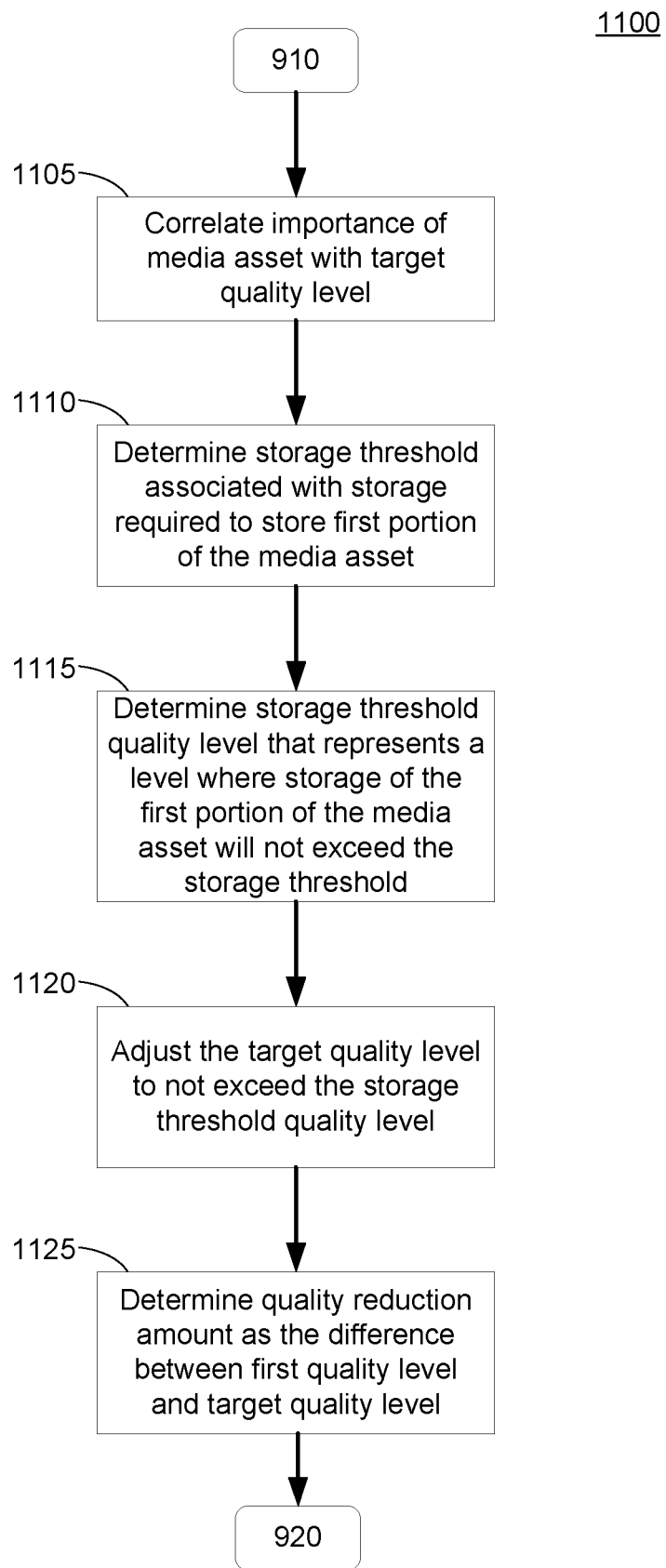
FIG. 11 depicts an illustrative flowchart of a process for determining the quality level for storing a media asset, in accordance with some embodiments of the disclosure.

FIG. 11 depicts an illustrative flowchart of a process for determining the quality level for storing a media asset, in accordance with some embodiments of the disclosure. Process 1100 begins prior to transcoding a media asset, for example before step 920 of FIG. 9, and is used, in part, by some embodiments to determine the quality reduction discussed with reference to step 915 in FIG. 9. At 1105, control circuitry 604 correlates the importance of the media asset with a target quality level. In some embodiments, the control circuitry 604 evaluates the attributes of the media asset to determine weighted attribute scores. The control circuitry 604 combines the weighted attribute scores to produce a normalized importance score and correlates the normalized importance score with a recommended target quality value. For example, the control circuitry 604 may consider the following attributes in computing a normalized importance school: genre, run-length, current quality level, original channel, title, actors, director, writer, and original date/time. The importance score of a media asset may be calculated from the weighted scores. In some embodiments, the importance score may be the average of the weighted scores. In some embodiments, the control circuitry 604 correlates the importance score of the media asset with a target quality level.

At 1110, control circuitry 604 continues process 1100 by determining a storage threshold associated with storage space required to store the first portion of the media asset. For example, control circuitry 604 may determine how much space is occupied by a media asset in storage 608 or in a storage on a remote server such as remote server 715. Process 1100 continues at 1115, where control circuitry 604 determines a storage threshold quality level associated with the first portion of the media asset, wherein the threshold quality level represents a quality level at which storing of the first portion of the media asset will not require more storage space than the storage threshold. At 1120, control circuitry 604 adjusts the target quality level so the target quality level does not exceed the storage threshold quality level. Process 1100 continues at 1125, where control circuitry 604 determines the amount of quality by which to reduce the first quality level as the difference between the first quality level and the target quality level.

Figure 12:
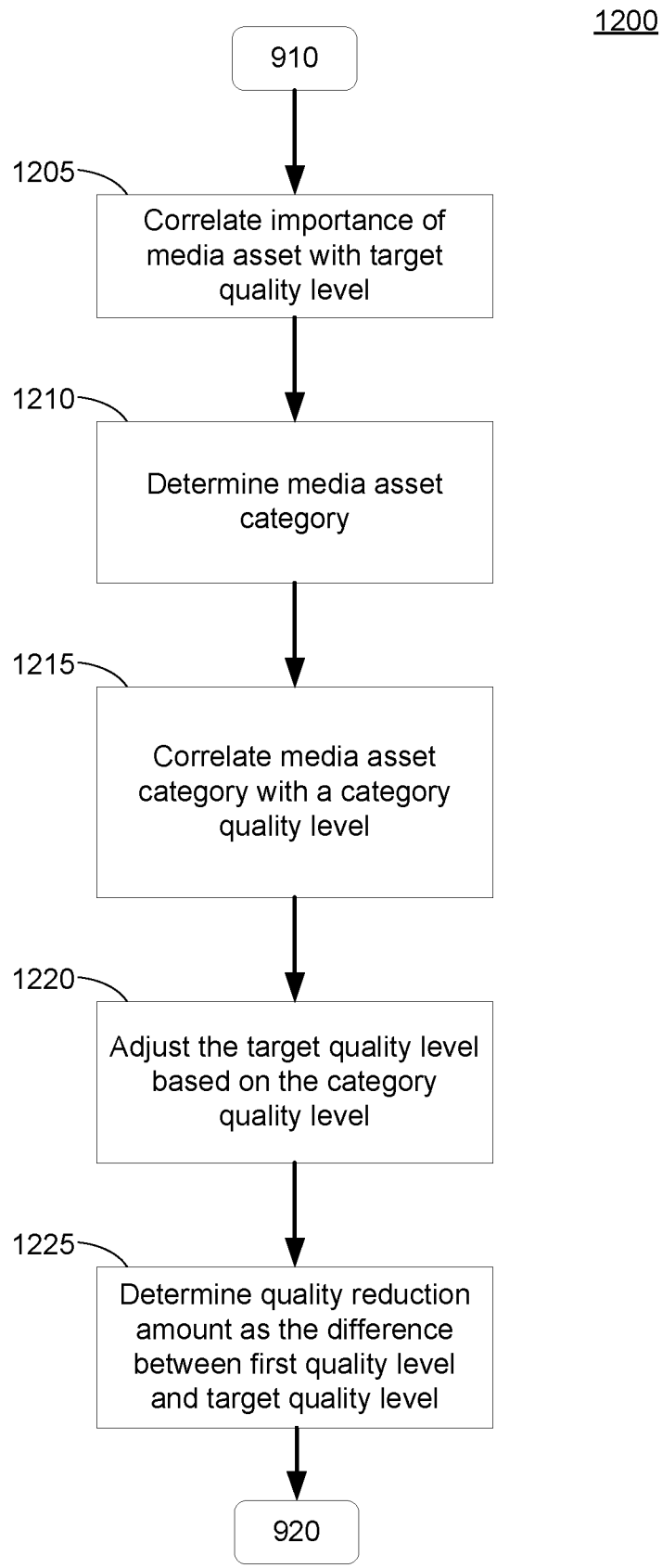
FIG. 12 depicts an illustrative flowchart of a process for determining the quality level for storing a media asset, in accordance with some embodiments of the disclosure.

FIG. 12 depicts an illustrative flowchart of a process for determining the quality level for storing a media asset, in accordance with some embodiments of the disclosure. Process 1200 begins prior to transcoding a media asset, for example before step 920 of FIG. 9 and is used, in part, by some embodiments to determine the quality reduction discussed with reference to step 915 in FIG. 9. At 1205, control circuitry 604 correlates the importance of the media asset with a target quality level in a manner similar to those described above. Process 1200 continues at 1210, where control circuitry 604 determines a media asset category based on an attribute of the plurality of attributes. For example, the control circuitry 604 may analyze a plurality of attributes to determine a media asset category or may base the category on a single attribute of the plurality of attributes.

The control circuitry 604 continues process 1200 by correlating the media asset category with a category quality level at 1215. For example, the control circuitry 604 may determine that a media asset is an action movie rated "R" and that media assets in that category have a category quality level of 4K. It may be that the target quality level, based on other factors, was HD, and the control circuitry 604 may adjust the target quality to 4K based on the category quality level. Going the other direction, the control circuitry 604 may determine that a media asset is a children's program and that media assets in that category have a category quality level of SDK. It may be that the target quality level, based on other factors, was HD, and the control circuitry 604 may adjust the target quality to SD based on the category quality level.

At 1220, control circuitry 604 continues process 1200 by adjusting the target quality level based on the category quality level. Process 1200 continues at 1225, where control circuitry 604 determines the amount of quality by which to reduce the first quality level as the difference between the first quality level and the target quality level.

Figure 13:
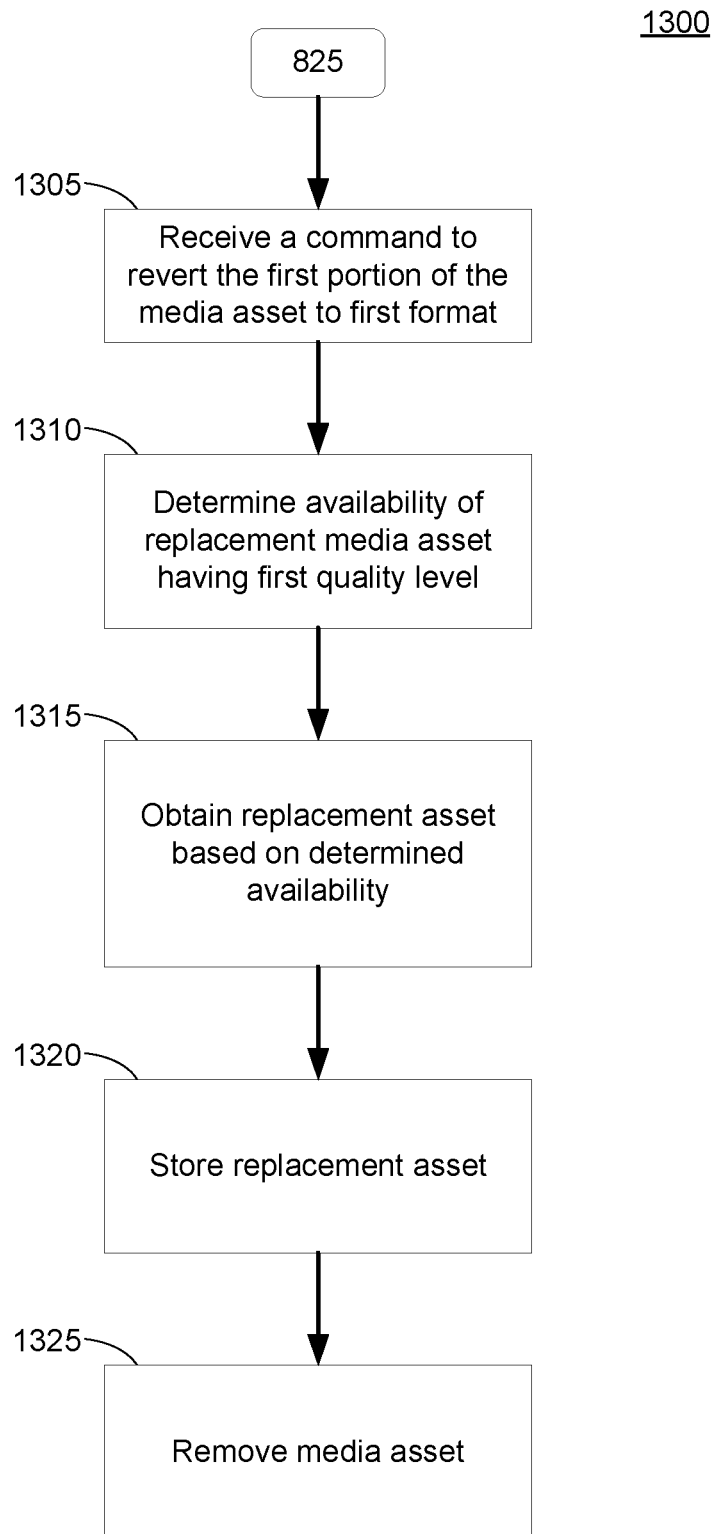
FIG. 13 depicts an illustrative flowchart of a process for reverting an altered media asset to a higher quality format, in accordance with some embodiments of the disclosure.

FIG. 13 depicts an illustrative flowchart of a process for reverting an altered media asset to a higher quality format, in accordance with some embodiments of the disclosure. Process 1300 begins after the control circuitry 604 alters the quality levels and formats of a stored media asset, for example after step 825 of FIG. 8.

At step 1305, control circuitry 604 receives a command to revert the media asset from the second format to the first format. For example, control circuitry 604 may receive a user interaction such as described with reference to FIG. 2. In response to receiving the command, the control circuitry 604 continues process 1300 at 1310 by determining an availability of a replacement media asset in a format having the first quality level, the replacement asset containing content similar to the transcoded media asset and being in a format having a quality level that does not fall below the first quality level. For example, the control circuitry 604 may determine that a first portion of the media asset is stored in SD and that an upcoming broadcast of the media asset will be in 4K. Therefore, the control circuitry 604 would be able to replace the first portion of the media asset by recording the first portion from the upcoming broadcast. The control circuitry 604 may determine that the first portion of the media asset is available for retrieval from a remote server 717 or media content source 716. In embodiments in which the control circuitry 604 is able to store portions of media assets in secondary storage, the control circuitry 604 may determine that the first portion is available in secondary storage. In some embodiments, the replacement asset does not have to be identical to the original media asset. For example, if the original media asset was recorded from broadcast television and the replacement asset is from an upcoming broadcast, it is unlikely that the commercials will be the same and the media asset may differ in some content. But the replacement media asset will contain content similar to the media asset. Further, if the replacement media asset is of lower quality than the currently stored, transcoded media asset, then there is little reason to retrieve the replacement media asset. Therefore, typically the replacement media asset will identify as being in a format having a quality level that exceeds the first quality level.

At 1315, the control circuitry 604 continues process 1300 by obtaining the replacement asset based on the determined availability. Process 1300 continues at 1320, where the control circuitry 604 stores the replacement asset. For example, the control circuitry 604 may store the replacement media asset in storage 608. At 1325, control circuitry 604 removes the media asset. For example, control circuitry 604 may delete a file from storage 608 that contains the media asset.

Figure 14:
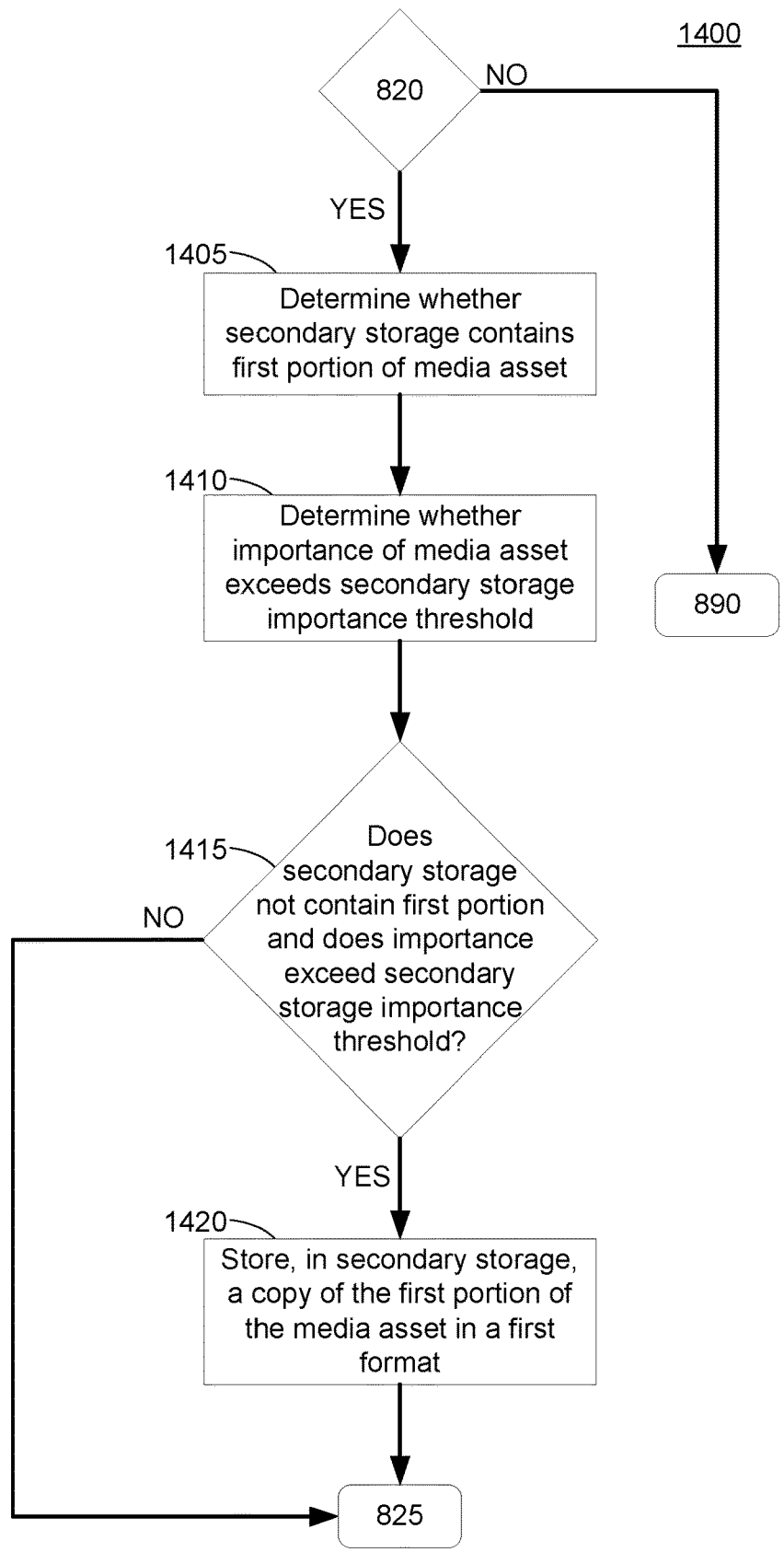
FIG. 14 depicts an illustrative flowchart of a process for storing a portion of a media asset in a first format in secondary storage, in accordance with some embodiments of the disclosure.

FIG. 14 depicts an illustrative flowchart of a process for storing a portion of a media asset in a first format in secondary storage, in accordance with some embodiments of the disclosure. Process 1400 continues after the control circuitry 604 detects that the threshold period of time since the given time has passed, for example after step 820 from FIG. 8.

At 1405, control circuitry 604 determines whether a secondary storage contains the first portion of the media asset in the first format. For example, the secondary storage may be a secondary hard disk or solid-state disk or other long-term storage device in storage 608. The secondary storage may also reside at a remote location such as a remote server 715. For example, the media guidance application may identify the first 25% of a stored media asset should be transcoded from 4K to HD. The media guidance application then checks whether the secondary storage contains the first 25% of the stored media asset in 4K and may receive an indication of whether or not that portion of the media asset is in secondary storage and use that indication to determine, in part, whether to store the first portion in secondary storage. For example, the control circuitry 604 may determine that all of the media asset is stored in 4K and therefore the first portion, comprising the first 25% of the media asset, is in the secondary storage. In another example, the control circuitry 604 may be checking whether the secondary storage contains a first portion of the media asset in a lower quality level, such as SD quality. The control circuitry 604 may determine that the first portion exists in the secondary storage in a higher quality level such as 4K. Therefore, the control circuitry 604 may determine that storage of the first portion in a lower quality level, e.g., SD quality, is redundant to the higher quality level storage. For example, the control circuitry 604 may determine that secondary storage contains a third portion of the media asset. In response to determining that secondary storage contains the third portion of the media asset, the control circuitry 604 determines whether a quality level of the third portion of the media asset falls below the first quality level and determines whether the third portion of the media asset comprises similar media content as the first portion of the media asset. For example, if the copy of the media asset from secondary storage and the first portion of the media asset are from two broadcasts, the assets may contain different advertisements but otherwise contain similar content for the main program. If the control circuitry 604 determines that third portion comprises similar media content as the first portion of the media asset and that the quality level of the third portion of the media asset does not fall below the first quality level (e.g. the content is similar and the secondary storage does not contain a lesser quality copy), the control circuitry 604 may indicate not to store the first portion of the media asset in the first quality level because it is redundant to what is already stored in the secondary storage.

At 1410, control circuitry 604 determines whether the importance of the media asset exceeds a secondary storage importance threshold. For example, the control circuitry 604 may employ techniques such as those described above to determine an importance of a media asset that has been adjusted for determining whether a media asset should be stored in secondary storage.

Process 1400 continues at 1415, where control circuitry 604 determines whether to store, in the secondary storage, the first portion of the media asset in the first format by determining that the secondary storage does not contain the first portion of the media asset in the first format and determining that the importance of the media asset exceeds the secondary storage importance threshold. If control circuitry 604 determines to store, in the secondary storage, the first portion of the media asset in the first format, the process continues at 1420 where control circuitry 604 stores, in the secondary storage, a copy of the first portion of the media asset in the first format.

Figure 15:
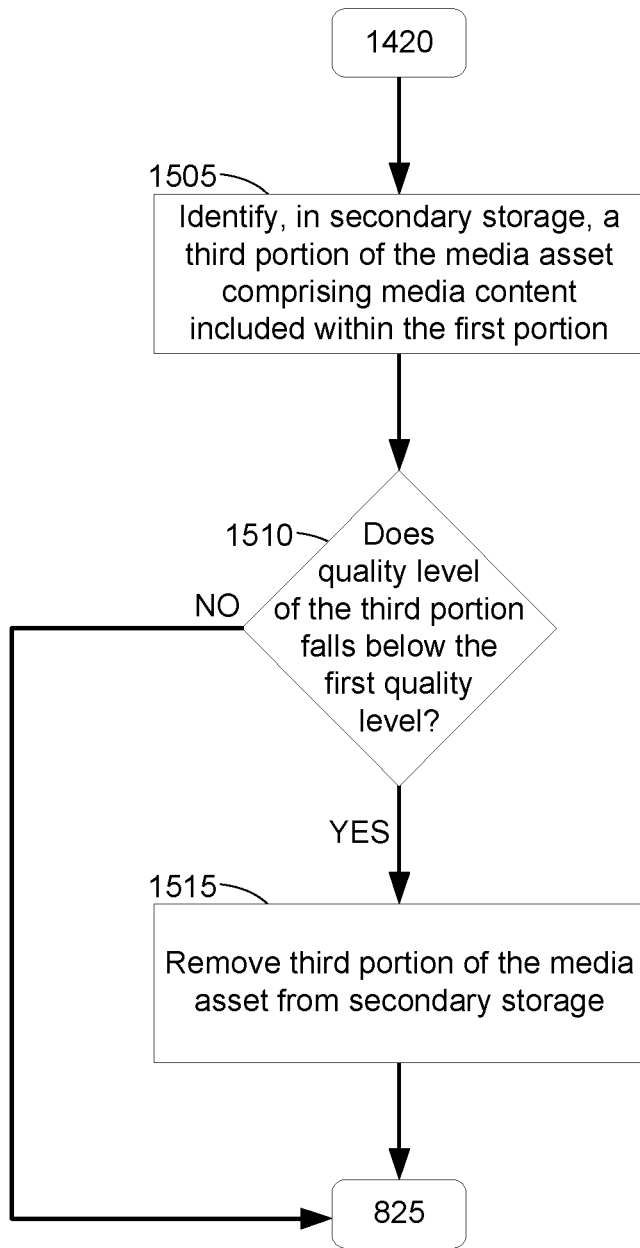
FIG. 15 depicts an illustrative flowchart of a process for managing storage of media assets in secondary storage, in accordance with some embodiments of the disclosure.

FIG. 15 depicts an illustrative flowchart of a process for managing storage of media assets in secondary storage, in accordance with some embodiments of the disclosure. Process 1500 begins after the control circuitry 604 stores a portion of a media asset in secondary storage, for example after step 1420 from FIG. 14. The control circuitry 604 identifies, in the secondary storage, a third portion of the media asset comprising media content included within the first portion of the media asset at step 1505. Process 1500 continues at 1510, where the control circuitry 604 determines whether a quality level of the third portion of the media asset falls below the first quality level. If control circuitry 604 determines that the quality level of the third portion of the media asset falls below the first quality level, the control circuitry 604 removes the third portion of the media asset from secondary storage at 1515. For example, the control circuitry 604 may determine that the secondary storage contains an SD-quality copy of an episode of "Classical Baby" that is currently in 4K and is being stored in the secondary storage. In response to determining that the quality level of the third portion of the media asset falls below the first quality level, the control circuitry 604 removes the third portion of the media asset from secondary storage.

Figure 16:
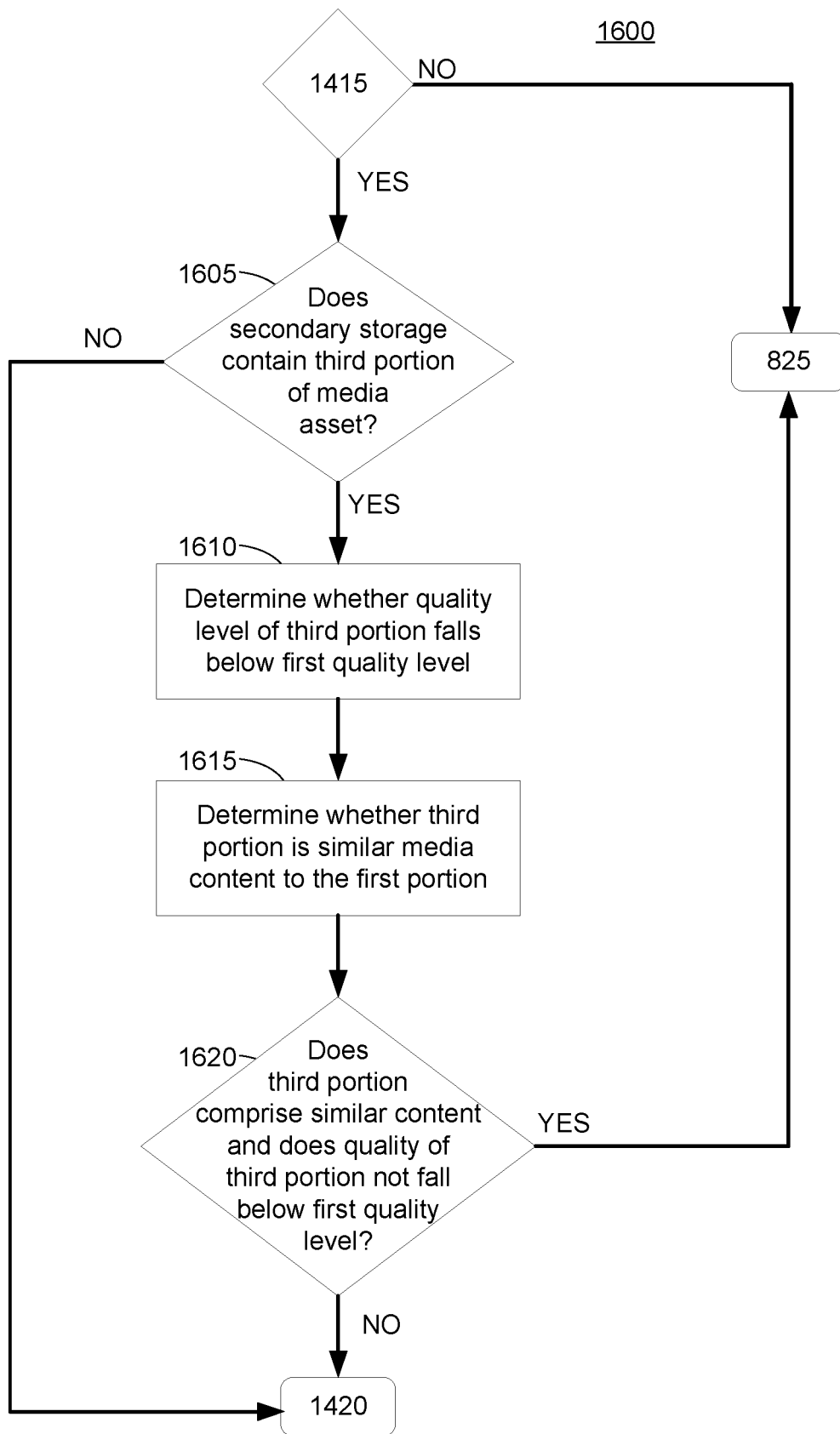
FIG. 16 depicts an illustrative flowchart of a process for managing storage of media assets in secondary storage, in accordance with some embodiments of the disclosure.

FIG. 16 depicts an illustrative flowchart of a process for managing storage of media assets in secondary storage, in accordance with some embodiments of the disclosure. Process 1600 provides additional intelligence for determining whether to store a portion of a media asset in secondary storage. In some embodiments, process 1600 begins after the control circuitry 604 determines to store a portion of a media asset in secondary storage, for example after step 1415 from FIG. 14.

At 1605, control circuitry 604 determines whether secondary storage contains a third portion of the media asset. For example, the control circuitry 604 may determine that the first 10 minutes of an episode of "Classical Baby" should be stored in HD in secondary storage. The control circuitry 604 may further determine that the first 15 minutes of "Classical Baby" exists in 4K in the secondary storage. If the control circuitry 604 determines that secondary storage contains the third portion of the media asset, then the control circuitry 604 continues process 1600 by determining whether a quality level of the third portion of the media asset falls below the first quality level at 1610. At 1615, control circuitry 604 continues process 1600 by determining whether the third portion of the media asset comprises similar media content as the first portion of the media asset. At 1620, control circuitry 604 determines whether the third portion comprises similar media content as the first portion of the media asset and whether the quality level of the third portion of the media asset does not fall below the first quality level. If both conditions are met, the control circuitry 604 indicates not to store the first portion of the media asset in the first quality level. If the conditions are not both met, the control circuitry 604 indicates that the first portion of the media asset should be stored in the secondary storage. Continuing the example above, control circuitry 604 determines that secondary storage contains the portion of the media asset, e.g. the first 10 minutes of "Classical Baby", in a sufficient quality level, e.g. 4K, such that additional storage is not needed.

Figure 17:
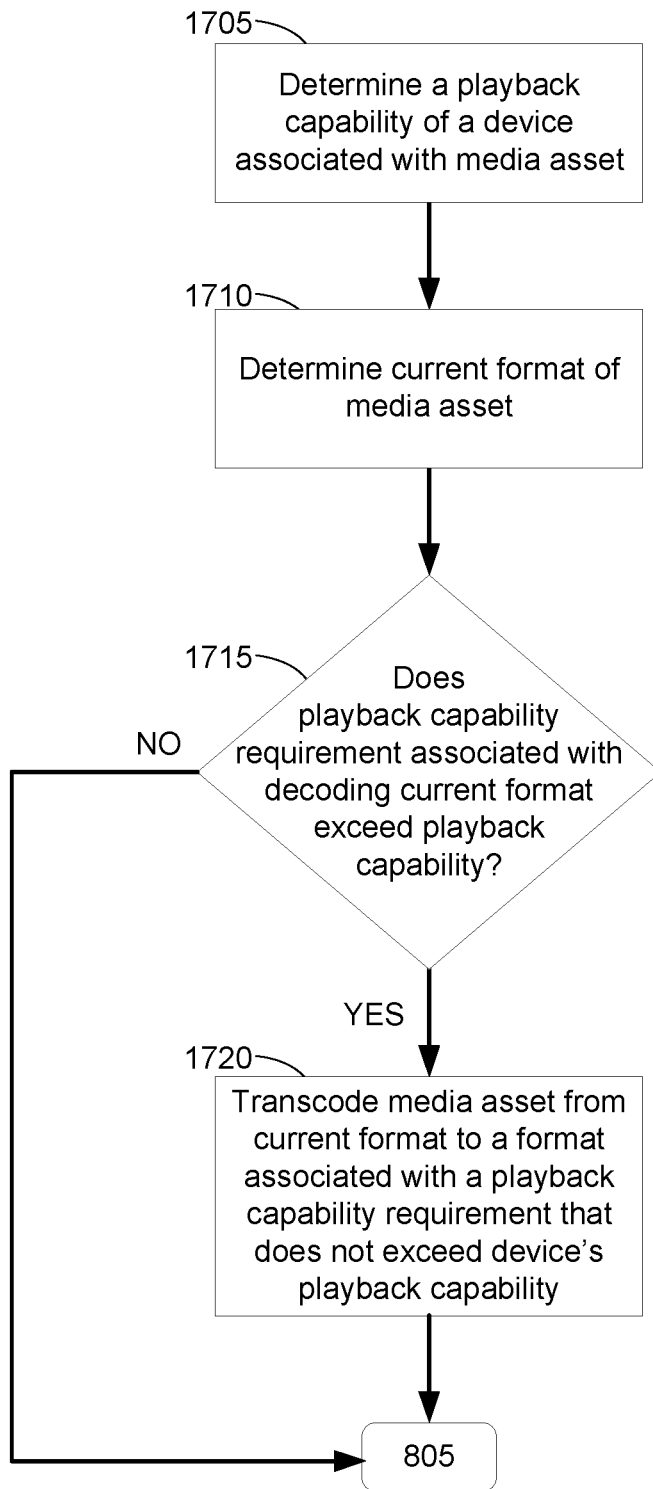
FIG. 17 depicts an illustrative flowchart of a process for managing the quality levels and formats used to store media assets, in accordance with some embodiments of the disclosure.

FIG. 17 depicts an illustrative flowchart of a process for managing the quality levels and formats used to store media assets, in accordance with some embodiments of the disclosure. In some embodiments, the control circuitry 604 may transcode the media asset when storing the media asset to ensure that a media device, such as user equipment 704, associated with the storage of the media asset is capable of decoding and playing back the stored media asset.

Process 1700 occurs before storing a media asset that will be decoded and/or played back by a media device, for example before 805 of FIG. 8. The control circuitry 604 determines a playback capability of a device associated with the media asset at 1705. For example, the control circuitry 604 may determine that a user equipment is only capable of playing SD video and therefore storage associated with that user equipment should be limited to SD storage to save space.

Process 1700 continues at 1710, where control circuitry 604 determines a current format of the media asset. For example, control circuitry 604 may determine that an episode of "Classical Baby" is stored at a quality level of 4K. At 1715, control circuitry 604 determines whether a playback capability requirement associated with decoding the media asset in the current format exceeds the determined playback capability. Continuing the example, the playback capability is lower than 4K, it is SD. If the control circuitry 604 determines that the playback capability requirement associated with decoding the media asset in the current format exceeds the determined playback capability, the control circuitry 604 transcodes the media asset from the current format to the first format, wherein the first format is associated with a second playback capability requirement that does not exceed the determined playback capability at 1720.

Figure 18:
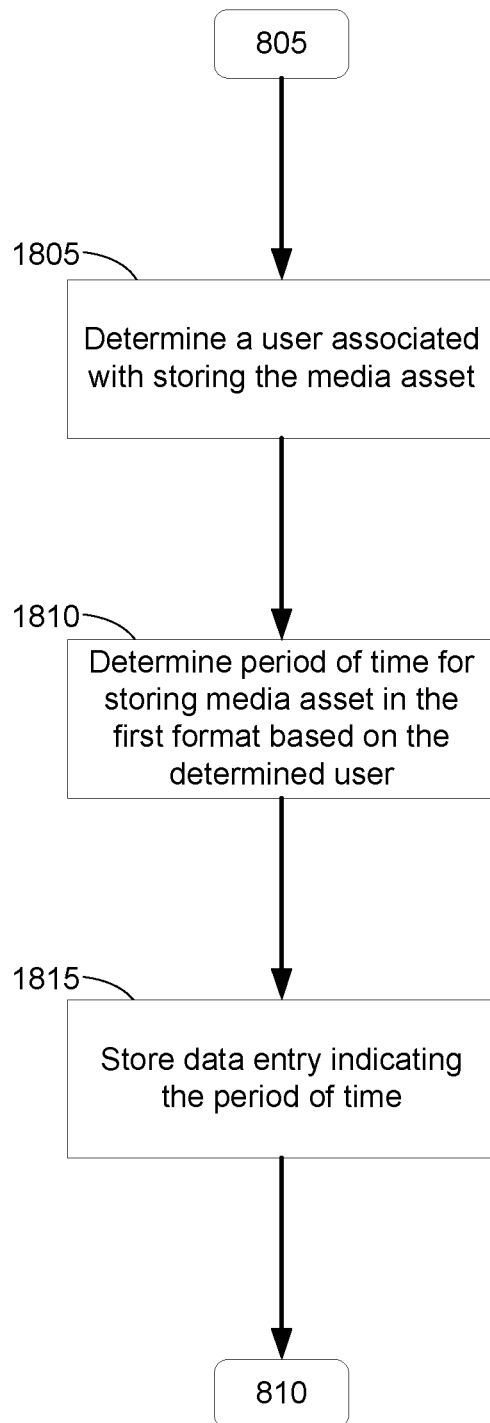
FIG. 18 depicts an illustrative flowchart of a process for determining a time period to store a media asset before managing the quality levels and formats used to store the media asset, in accordance with some embodiments of the disclosure.

In some embodiments, the control circuitry 604 determines the time period based on a user associated with the storage of the media asset. FIG. 18 depicts an illustrative flowchart of a process for determining a time period to store a media asset before managing the quality levels and formats used to store the media asset, in accordance with some embodiments of the disclosure.

Process 1800 occurs before the control circuitry 604 accesses the data entry associated with the stored media asset, e.g. before step 810 in FIG. 8. At 1805, the control circuitry 604 determines a user associated with the storing of the media asset. For example, the media guidance application may receive interactions from a plurality of users and some users may be given a higher priority for storage of media assets than other users. When the control circuitry 604 receives a command to store a media asset, the control circuitry 604 identifies a user associated with that command, for example by retrieving a username or ID associated with a logged-in user.

Process 1800 continues at 1810, where control circuitry 604 determines the period of time for storing the media asset in the first format based on the determined user. For example, a user may have a preference that high quality copies of media assets are held for only 1 week. Or the control circuitry 604 may determine that between two users, the determined user has a lower storage priority and is therefore allotted storage space for higher quality storage of media assets for a lower amount of time compared to the other user. At 1815, control circuitry 604 continues process 1800 by storing the data entry indicating the period of time for storing the media asset in the first format based on the determined user. For example, the control circuitry 604 may save the time period in a data entry associated with the media asset as described above.

It should be noted that the processes described with reference to FIGS. 8-18 or any step thereof could be performed on, or provided by, any of the devices shown in FIGS. 1-3 and 6-7. For example, any of the processes described with reference to FIGS. 8-18 may be executed by control circuitry 604 (FIG. 6) as instructed by control circuitry implemented on user equipment 702, 704, 706 (FIG. 7), and/or a user equipment device for playback of a media asset. In addition, one or more steps of the processes described with reference to FIGS. 8-18 may be incorporated into or combined with one or more steps of any other process or embodiment.

It is contemplated that the steps or descriptions of each of FIGS. 8-18 may be used with any other embodiment of this disclosure. In addition, the steps and descriptions described in relation to FIGS. 8-18 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-3 and 6-7 could be used to perform one or more of the steps in FIGS. 8-18.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining a position of a user may be performed, e.g., by processing circuitry 606 of FIG. 6. The processing circuitry, for instance, may be a general purpose processor, a customized integrated circuit (e.g., an ASIC), or a field-programmable gate array (FPGA) within user equipment 60, media content source 716, or media guidance data source 718. For example, a profile, as described herein, may be stored in, and retrieved from, storage 608 of FIG. 6, or media guidance data source 718 of FIG. 7. Furthermore, processing circuitry, or a computer program, may update settings of user equipment 100 stored within storage 608 of FIG. 6 or media guidance data source 718 of FIG. 7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for reducing storage space occupied by a media asset by adjusting quality levels of the media asset downward over time, the method comprising:

storing, at a given time, the media asset in a first format having a first quality level;

retrieving, from a database, a data entry corresponding to the media asset;

determining, based on the data entry, a threshold period of time for storing the media asset in the first format;

detecting whether the threshold period of time since the given time has passed;

in response to detecting that the threshold period of time since the given time has passed, altering a first portion of the media asset from the first format having the first quality level to a second format having a second quality level by:

determining a plurality of attributes corresponding to the media asset based on information indicated by the data entry;

computing an importance of the media asset based on each attribute of the plurality of attributes;

determining an amount of quality by which to reduce the first quality level based, in part, on the importance of the media asset; and transcoding the first portion of the media asset from the first format to the second format by reducing the first quality level by the determined amount to the second quality level.

2. The method of claim 1, further comprising determining the first portion of the media asset by:

detecting a time point in the media asset where playback of the media asset was suspended;

determining whether the time point occurs within a threshold amount of time from the endpoint of the media asset; and in response to determining that the time point occurs within a threshold amount of time from the endpoint of the media asset, identifying the first portion of the media asset as a portion of the media asset from a start point of the media asset to a time point in the media asset after where playback of the media asset was suspended; and in response to determining that the time point occurs outside of the threshold amount of time from the endpoint of the media asset, identifying the first portion of the media asset as a portion of the media asset from a start point of the media asset to the time point in the media asset where playback of the media asset was suspended.

3. The method of claim 1, wherein determining the amount of quality by which to reduce the first quality level further comprises:

correlating the importance of the media asset with a target quality level;

determining a storage threshold associated with storage space required to store the first portion of the media asset;

determining a storage threshold quality level associated with the first portion of the media asset, wherein the threshold quality level represents a quality level at which storing of the first portion of the media asset will not require more storage space than the storage threshold;

adjusting the target quality level so the target quality level does not exceed the storage threshold quality level; and determining the amount of quality by which to reduce the first quality level as the difference between the first quality level and the target quality level.

4. The method of claim 1, wherein determining the amount of quality by which to reduce the first quality level further comprises:
correlating the importance of the media asset with a target quality level;
determining a media asset category based on an attribute of the plurality of attributes;
correlating the media asset category with a category quality level;
adjusting the target quality level based on the category quality level; and
determining the amount of quality by which to reduce the first quality level as the difference between the first quality level and the target quality level.

5. The method of claim 1, further comprising:
receiving a command to revert the media asset from the second format to the first format;
in response to receiving the command:
determining an availability of a replacement media asset in a format having the first quality level, the replacement asset containing content similar to the transcoded media asset and being in a format having a quality level that does not fall below the first quality level;
obtaining the replacement asset based on the determined availability;
storing the replacement asset; and
removing the media asset.

6. The method of claim 1, further comprising:
further in response to detecting that the threshold period of time since the given time has passed, managing storage of the media asset in a secondary storage by:
determining whether a secondary storage contains the first portion of the media asset in the first format;
determining whether the importance of the media asset exceeds a secondary storage importance threshold;
determining whether to store, in the secondary storage, the first portion of the media asset in the first format by determining that the secondary storage does not contain the first portion of the media asset in the first format and determining that the importance of the media asset exceeds the secondary storage importance threshold; and
in response to determining to store in the secondary storage, the first portion of the media asset in the first format, storing, in the secondary storage, a copy of the first portion of the media asset in the first format.

7. The method of claim 6, wherein managing the storage of the media asset in the secondary storage further comprises:
identifying, in the secondary storage, a third portion of the media asset comprising media content included within the first portion of the media asset; determining whether a quality level of the third portion of the media asset falls below the first quality level; and
in response to determining that the quality level of the third portion of the media asset falls below the first quality level, removing the third portion of the media asset from secondary storage.

8. The method of claim 6, wherein determining whether to store, in the secondary storage, the first portion of the media asset in the first format further comprises:
determining whether secondary storage contains a third portion of the media asset; and
in response to determining that secondary storage contains the third portion of the media asset:
determining whether a quality level of the third portion of the media asset falls below the first quality level;
determining whether the third portion of the media asset comprises similar media content as the first portion of the media asset; and
in response to determining that third portion comprises similar media content as the first portion of the media asset and that the quality level of the third portion of the media asset does not fall below the first quality level, indicating not to store the first portion of the media asset in the first quality level.

9. The method of claim 1, wherein storing, at the given time, the media asset in the first format having the first quality level further comprises:
determining a playback capability of a device associated with the media asset;
determining a current format of the media asset;
determining whether a playback capability requirement associated with decoding the media asset in the current format exceeds the determined playback capability; and
in response to determining that the playback capability requirement associated with decoding the media asset in the current format exceeds the determined playback capability, transcoding the media asset from the current format to the first format, wherein the first format is associated with a second playback capability requirement that does not exceed the determined playback capability.

10. The method of claim 1, further comprising:
determining a user associated with the storing of the media asset;
determining the period of time for storing the media asset in the first format based on the determined user; and
storing the data entry indicating the period of time for storing the media asset in the first format based on the determined user.

11. A system for reducing storage space occupied by a media asset by adjusting quality levels of the media asset downward over time, the system comprising:
storage circuitry configured to:
store, at a given time, the media asset in a first format having a first quality level;
communication circuitry configured to:
retrieve, from a database, a data entry corresponding to the media asset;
control circuitry configured to:
determine, based on the data entry, a threshold period of time for storing the media asset in the first format;
detect whether the threshold period of time since the given time has passed;
in response to detecting that the threshold period of time since the given time has passed, alter a first portion of the media asset from the first format having the first quality level to a second format having a second quality level by:
determining a plurality of attributes corresponding to the media asset based on information indicated by the data entry;
computing an importance of the media asset based on each attribute of the plurality of attributes;
determining an amount of quality by which to reduce the first quality level based, in part, on the importance of the media asset; and transcoding the first portion of the media asset from the first format to the second format by reducing the first quality level by the determined amount to the second quality level.

12. The system of claim 11, wherein the control circuitry is further configured determine the first portion of the media asset by:
  detecting a time point in the media asset where playback of the media asset was suspended;
  determining whether the time point occurs within a threshold amount of time from the endpoint of the media asset; and
  in response to determining that the time point occurs within a threshold amount of time from the endpoint of the media asset, identifying the first portion of the media asset as a portion of the media asset from a start point of the media asset to a time point in the media asset after where playback of the media asset was suspended; and
  in response to determining that the time point occurs outside of the threshold amount of time from the endpoint of the media asset, identifying the first portion of the media asset as a portion of the media asset from a start point of the media asset to the time point in the media asset where playback of the media asset was suspended.

13. The system of claim 11, wherein the control circuitry is further configured, when determining the amount of quality by which to reduce the first quality level, to:
  correlate the importance of the media asset with a target quality level;
  determine a storage threshold associated with storage space required to store the first portion of the media asset;
  determine a storage threshold quality level associated with the first portion of the media asset, wherein the threshold quality level represents a quality level at which storing of the first portion of the media asset will not require more storage space than the storage threshold;
  adjust the target quality level so the target quality level does not exceed the storage threshold quality level; and
  determine the amount of quality by which to reduce the first quality level as the difference between the first quality level and the target quality level.

14. The system of claim 11, wherein the control circuitry is configured, when determining the amount of quality by which to reduce the first quality level, to:
  correlate the importance of the media asset with a target quality level;
determine a media asset category based on an attribute of the plurality of attributes;
  correlate the media asset category with a category quality level;
  adjust the target quality level based on the category quality level; and
  determine the amount of quality by which to reduce the first quality level as the difference between the first quality level and the target quality level.

15. The system of claim 11, further comprising:
input circuitry configured to:
  receive a command to revert the media asset from the second format to the first format;
  wherein the control circuitry is further configured, in response to receiving the command, to:
    determine an availability of a replacement media asset in a format having the first quality level, the replacement asset containing content similar to the transcoded media asset and being in a format having a quality level that does not fall below the first quality level;
    obtain the replacement asset based on the determined availability; and
  wherein the storage circuitry is further configured, in response to receiving the command, to:
    store the replacement asset; and
    remove the media asset.

16. The system of claim 11, wherein the control circuitry is further configured to:
  further in response to detecting that the threshold period of time since the given time has passed, manage storage of the media asset in a secondary storage by:
    determining whether a secondary storage contains the first portion of the media asset in the first format;
    determining whether the importance of the media asset exceeds a secondary storage importance threshold;
    determining whether to store, in the secondary storage, the first portion of the media asset in the first format by determining that the secondary storage does not contain the first portion of the media asset in the first format and determining that the importance of the media asset exceeds the secondary storage importance threshold; and
    in response to determining to store in the secondary storage, the first portion of the media asset in the first format, storing, in the secondary storage, a copy of the first portion of the media asset in the first format.

17. The system of claim 16, wherein the control circuitry is further configured, when managing the storage of the media asset in the secondary storage, to:
  identify, in the secondary storage, a third portion of the media asset comprising media content included within the first portion of the media asset;
  determine whether a quality level of the third portion of the media asset falls below the first quality level; and
  in response to determining that the quality level of the third portion of the media asset falls below the first quality level, remove the third portion of the media asset from secondary storage.

18. The system of claim 16, wherein the control circuitry is further configured, when determining whether to store, in the secondary storage, the first portion of the media asset in the first format, to:
  determine whether secondary storage contains a third portion of the media asset; and
  in response to determining that secondary storage contains the third portion of the media asset:
    determine whether a quality level of the third portion of the media asset falls below the first quality level;
    determine whether the third portion of the media asset comprises similar media content as the first portion of the media asset; and
    in response to determining that third portion comprises similar media content as the first portion of the media asset and that the quality level of the third portion of the media asset does not fall below the first quality level, indicate not to store the first portion of the media asset in the first quality level.

19. The system of claim 11, wherein the control circuitry is further configured, when storing, at the given time, the media asset in the first format having the first quality level, to:

determine a playback capability of a device associated with the media asset; determine a current format of the media asset;

determine whether a playback capability requirement associated with decoding the media asset in the current format exceeds the determined playback capability; and in response to determining that the playback capability requirement associated with decoding the media asset in the current format exceeds the determined playback capability, transcode the media asset from the current format to the first format, wherein the first format is associated with a second playback capability requirement that does not exceed the determined playback capability.

20. The system of claim 11, wherein the control circuitry is further configured to:

determine a user associated with the storing of the media asset;

determine the period of time for storing the media asset in the first format based on the determined user; and store the data entry indicating the period of time for storing the media asset in the first format based on the determined user.

\* \* \* \* \*